(12) United States Patent
Smithson

(10) Patent No.: US 8,826,374 B2
(45) Date of Patent: *Sep. 2, 2014

(54) APPROACH FOR SECURELY PROCESSING AN ELECTRONIC DOCUMENT

(75) Inventor: Brian Smithson, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,132

(22) Filed: Aug. 7, 2012

(65) Prior Publication Data

US 2012/0297471 A1 Nov. 22, 2012

Related U.S. Application Data

(60) Division of application No. 11/520,978, filed on Sep. 13, 2006, now Pat. No. 8,239,966, which is a continuation-in-part of application No. 11/486,796, filed on Jul. 13, 2006, now Pat. No. 7,605,933.

(51) Int. Cl.
*H04L 29/06* (2006.01)
*G06F 21/57* (2013.01)
*G06F 21/60* (2013.01)

(52) U.S. Cl.
CPC .............. *G06F 21/608* (2013.01); *G06F 21/57* (2013.01)
USPC ................................ 726/2; 713/182; 713/183

(58) Field of Classification Search
USPC ............................................................ 726/2
See application file for complete search history.

(56) References Cited

U.S. PATENT DOCUMENTS

| 5,619,684 | A | 4/1997 | Goodwin et al. |
| 6,408,392 | B2 | 6/2002 | White |
| 6,567,919 | B1 | 5/2003 | Yanagihara et al. |
| 6,778,289 | B1 | 8/2004 | Iwata |
| 7,079,278 | B2 | 7/2006 | Sato |
| 7,080,409 | B2 | 7/2006 | Eigeles |
| 7,266,695 | B2 | 9/2007 | Nakayama |
| 7,373,516 | B2 * | 5/2008 | Ashok et al. ................. 713/183 |
| 7,453,886 | B1 | 11/2008 | Allan |
| 7,752,651 | B2 | 7/2010 | Laird et al. |
| 8,031,349 | B2 | 10/2011 | Wang et al. |

(Continued)

FOREIGN PATENT DOCUMENTS

| JP | 11348380 A | 12/1999 |
| JP | 20002318737 A | 10/2000 |

(Continued)

*Primary Examiner* — Mohammad L Rahman
(74) *Attorney, Agent, or Firm* — Hickman Palermo Truong Becker Bingham Wong LLP; Edward A. Becker

(57) ABSTRACT

A method and apparatus for processing an electronic document in a secure manner is provided. A scanner may verify that the configuration state of a file server has not changed since a prior configuration state by issuing a request to a security server. The security server may process the request to determine whether the configuration state of the file server has changed since the file server was registered with the security server. The security server may also verify that the scanner issued a request to store an electronic document using a file server or that the file server received the request. A storage medium of a file server may be protected against unauthorized removal of the storage medium by storing, separate from the storage medium, a password required to access the storage medium, and when the file server is powered on, the password is provided to the storage medium.

12 Claims, 30 Drawing Sheets

(56) References Cited

U.S. PATENT DOCUMENTS

| | | | |
|---|---|---|---|
| 8,079,070 B2 * | 12/2011 | Camaisa et al. | ................ 726/10 |
| 2002/0171859 A1 | 11/2002 | Chen et al. | |
| 2004/0073712 A1 | 4/2004 | Larson et al. | |
| 2005/0021980 A1 | 1/2005 | Kanai | |
| 2005/0108548 A1 | 5/2005 | Ohta | |
| 2005/0219605 A1 | 10/2005 | Sato | |
| 2005/0257272 A1 | 11/2005 | Nakao | |
| 2008/0016548 A1 | 1/2008 | Smithson | |
| 2008/0016549 A1 | 1/2008 | Smithson | |
| 2008/0018925 A1 | 1/2008 | Smithson | |
| 2008/0123124 A1 | 5/2008 | Smithson | |
| 2008/0168118 A1 * | 7/2008 | Hickey et al. | ................. 709/201 |
| 2008/0201159 A1 * | 8/2008 | Gabrick et al. | ................... 705/1 |

FOREIGN PATENT DOCUMENTS

| | | |
|---|---|---|
| JP | 2000322364 A | 11/2000 |
| JP | 2005115519 A | 4/2005 |
| JP | 2005138322 A | 6/2005 |
| WO | WO 2004038563 A2 * | 5/2004 |

* cited by examiner

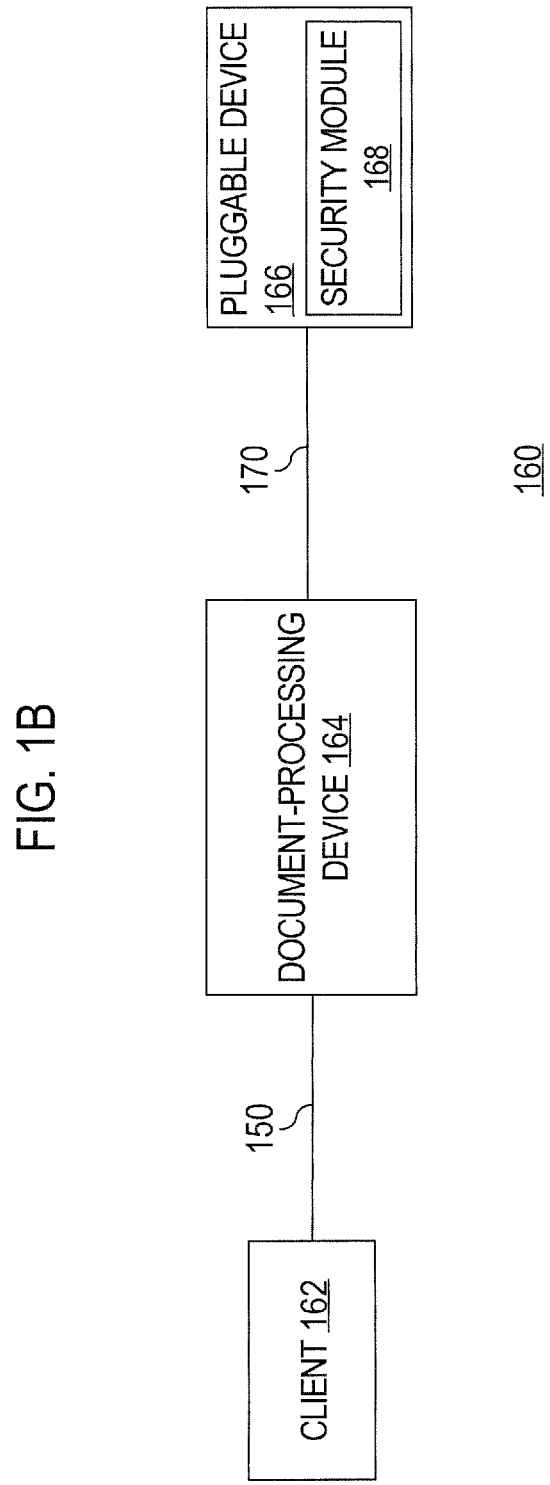

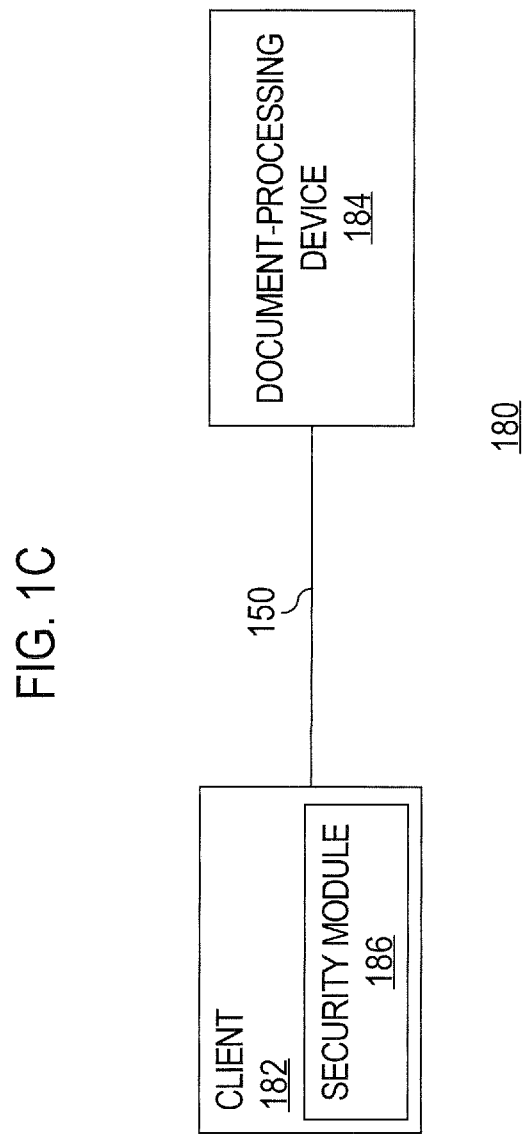

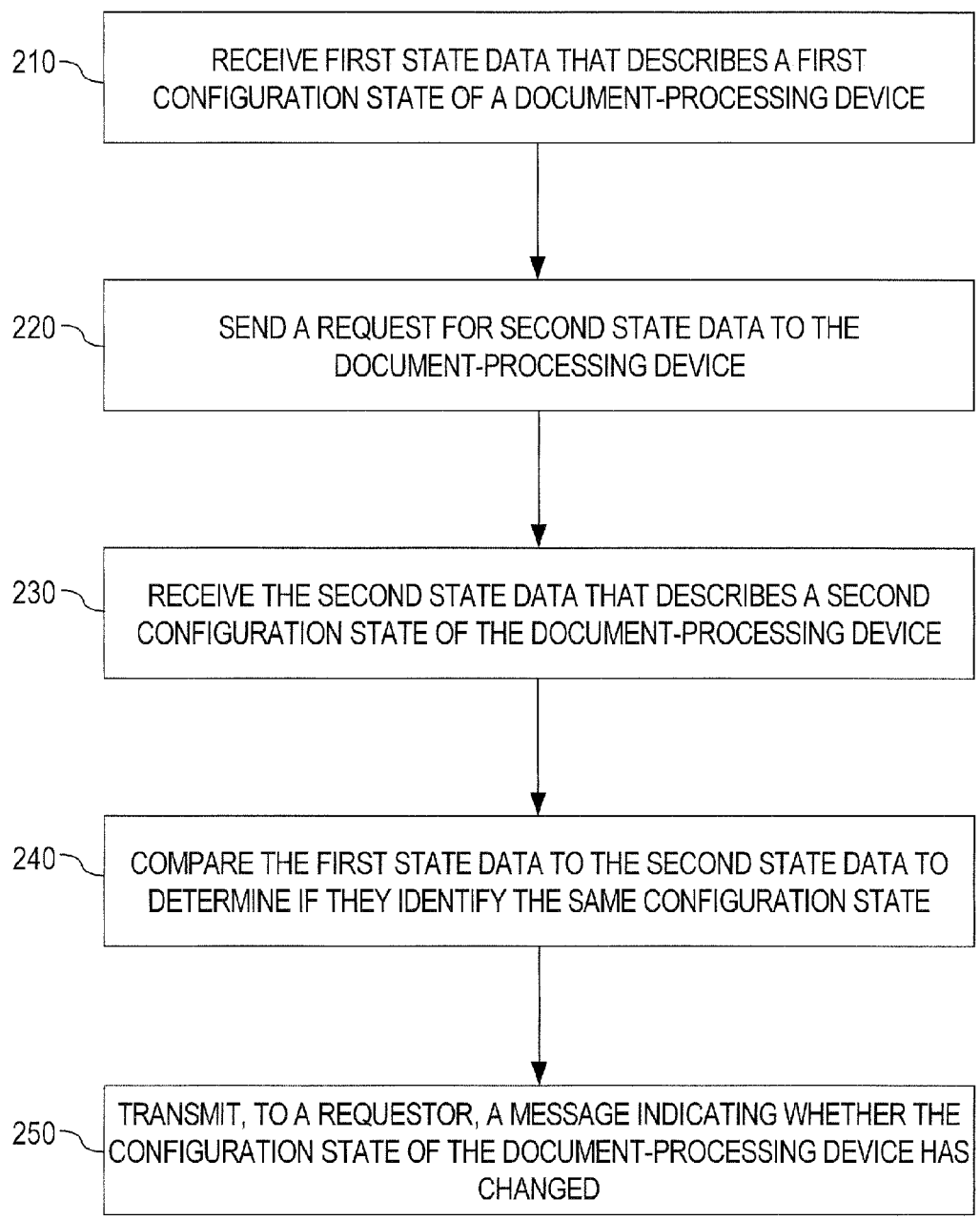

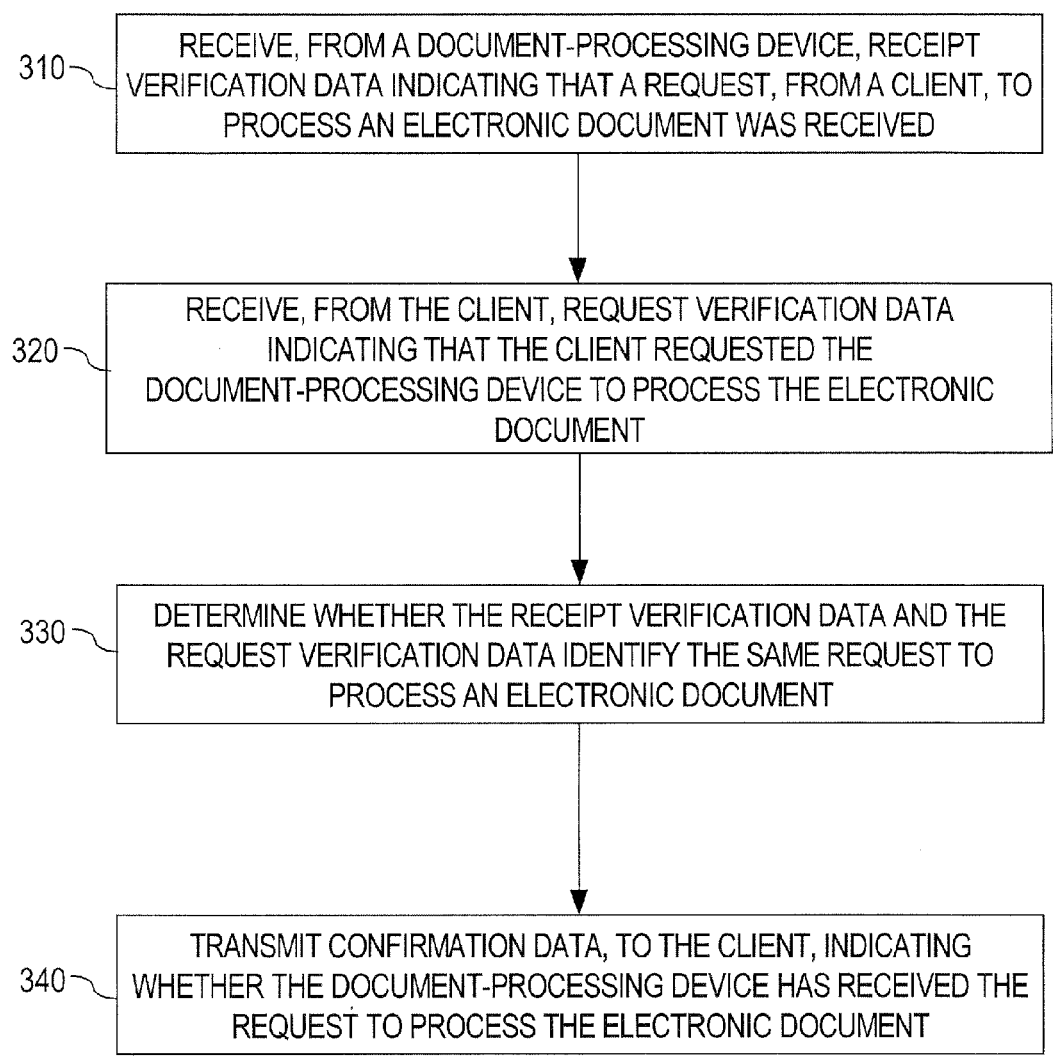

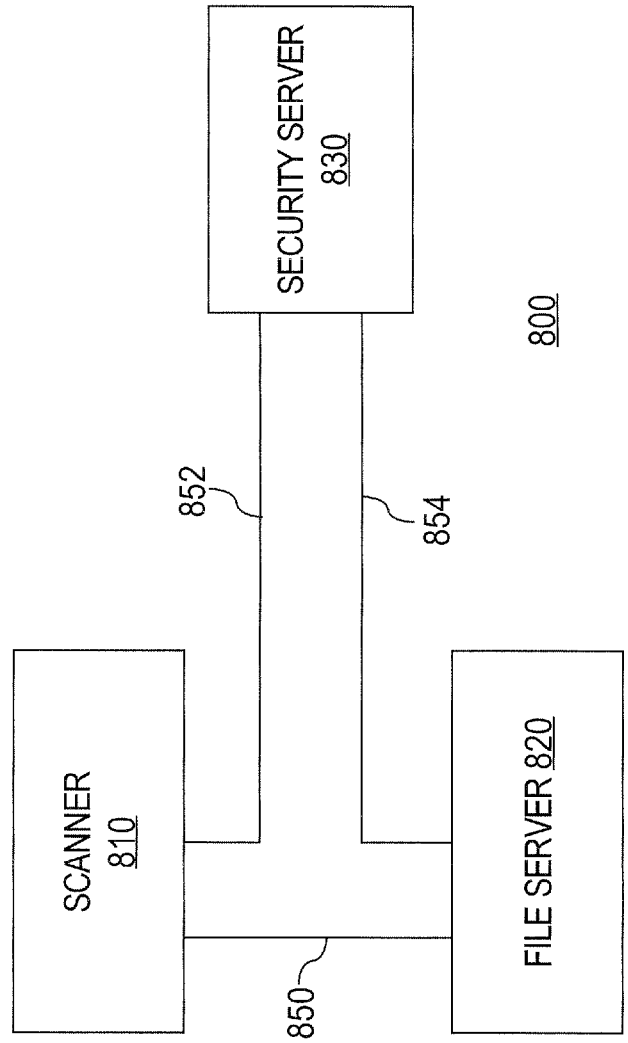

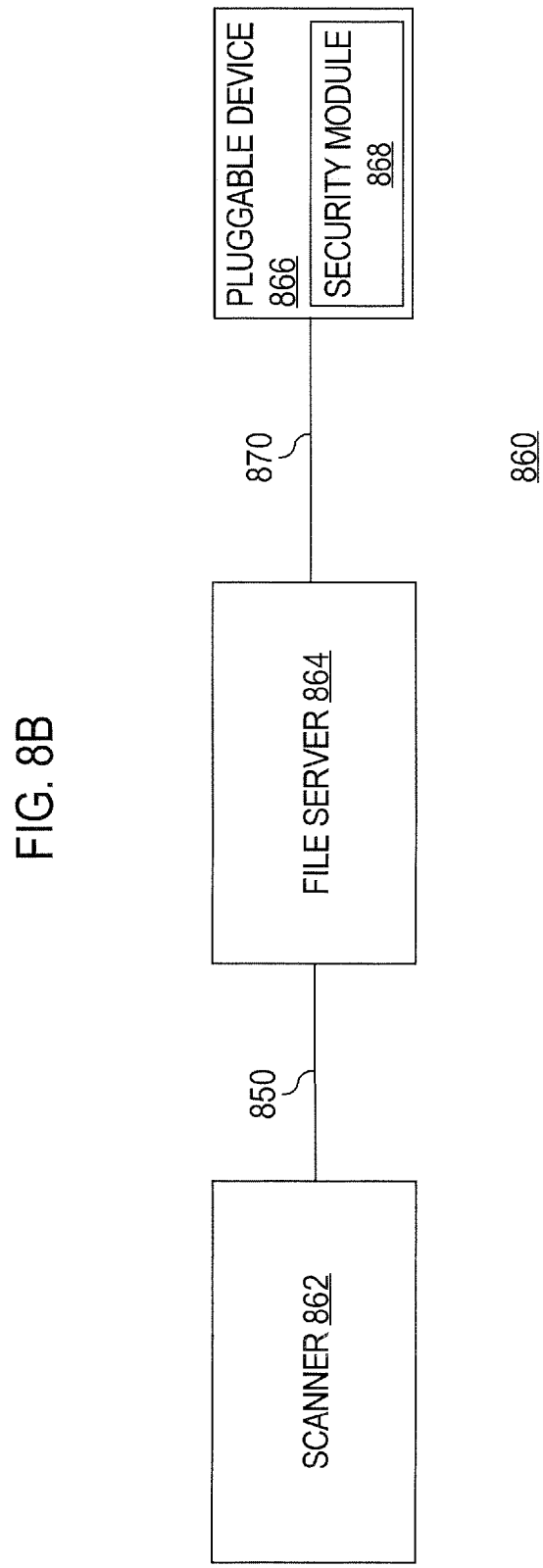

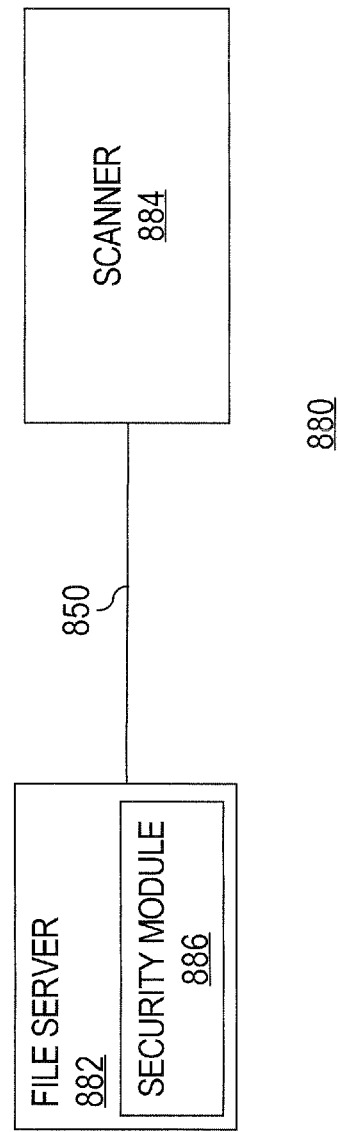

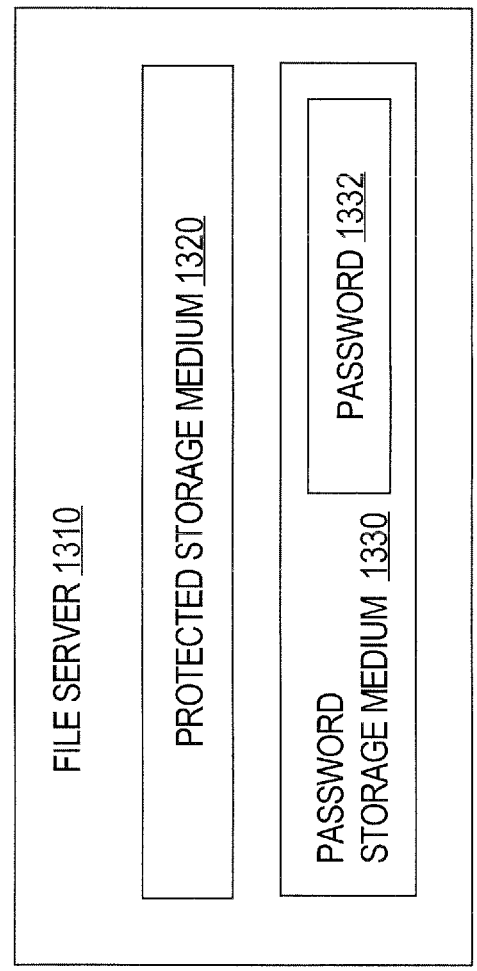

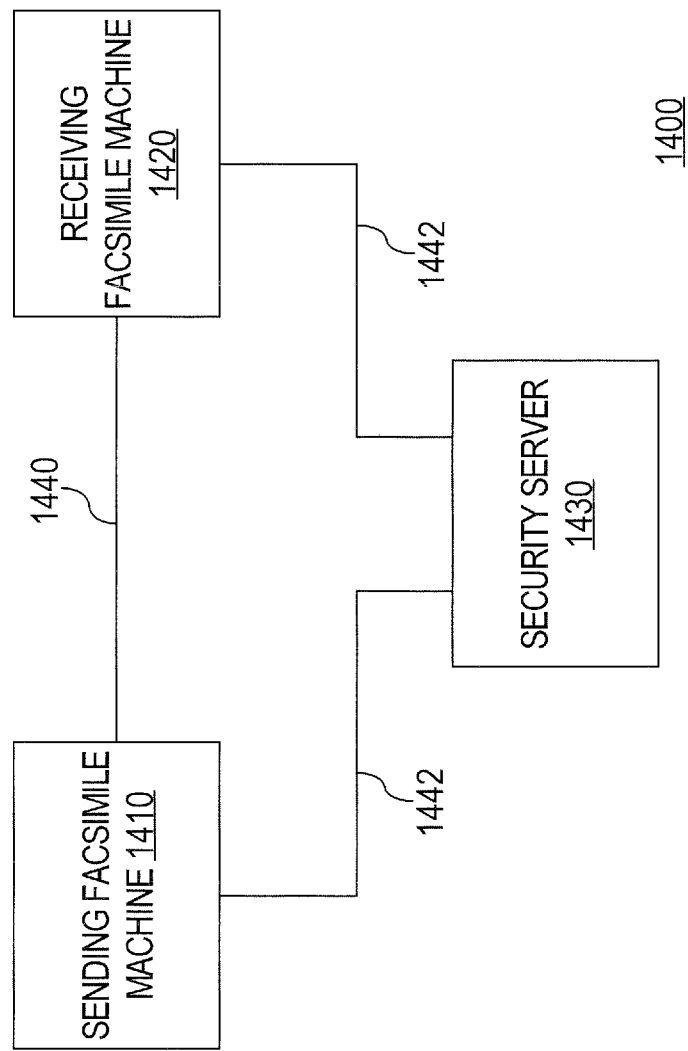

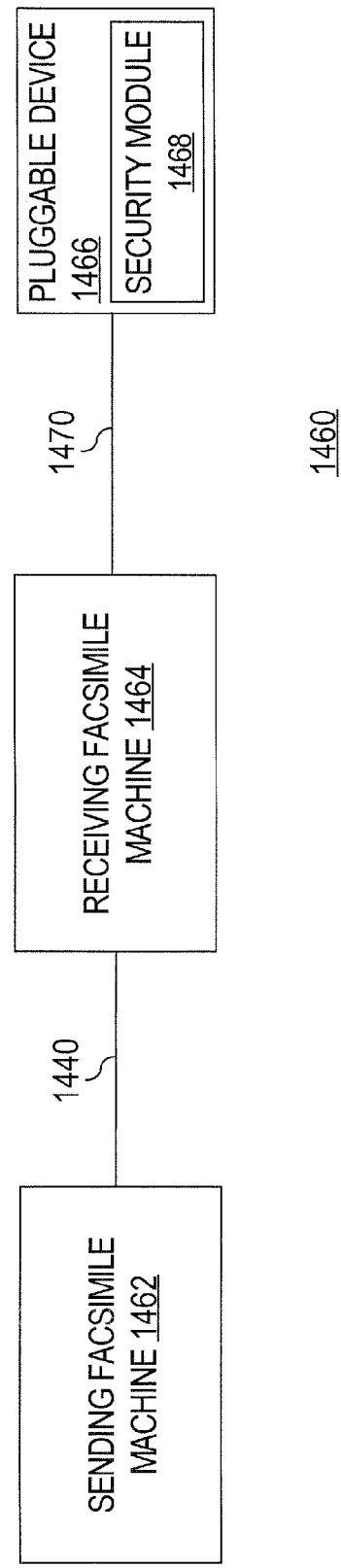

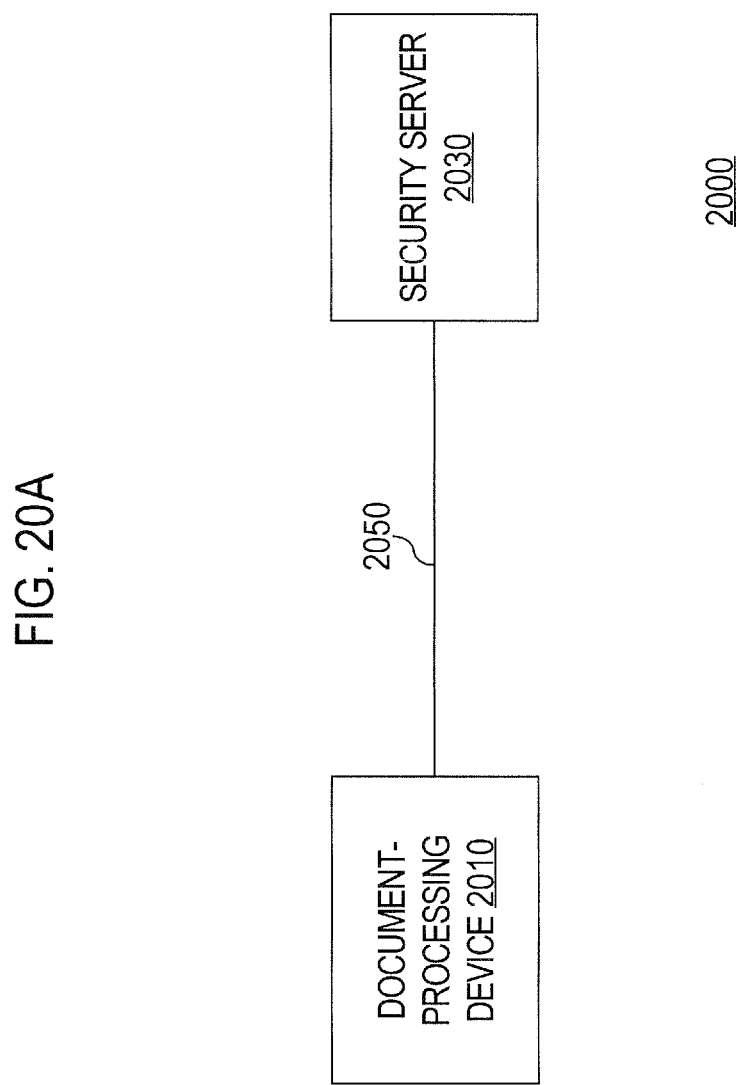

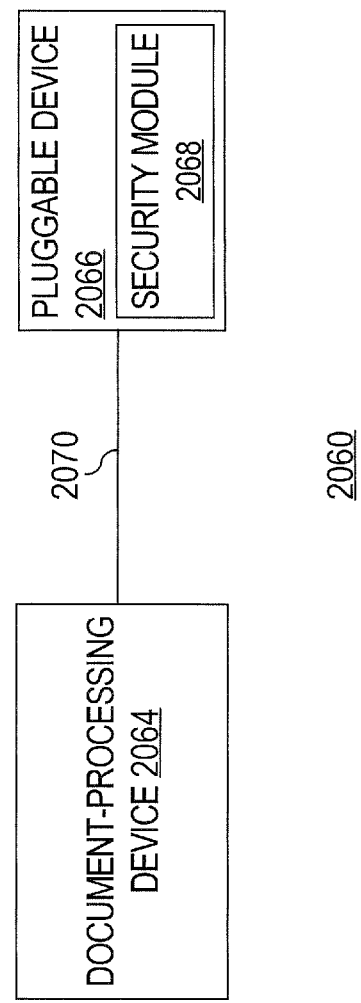

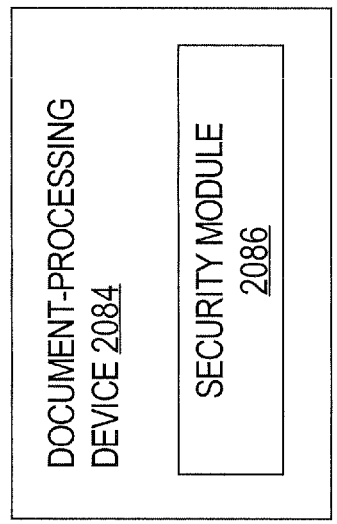

APPROACH FOR SECURELY PROCESSING AN ELECTRONIC DOCUMENT

RELATED APPLICATION DATA AND CLAIM OF PRIORITY

This application is a Divisional Patent Application of U.S. patent application Ser. No. 11/520,978 (U.S. Pat. No. 8,239,966) entitled APPROACH FOR SECURELY PROCESSING AN ELECTRONIC DOCUMENT, filed Sep. 13, 2006, which is a continuation-in-part of, and claims priority to, U.S. patent application Ser. No. 11/486,796 (U.S. Pat. No. 7,605,933) entitled APPROACH FOR SECURELY PROCESSING AN ELECTRONIC DOCUMENT, filed Jul. 13, 2006, the contents of which are incorporated by reference for all purposes as if fully set forth herein.

This application is related to U.S. patent application Ser. No. 11/520,952 (U.S. Pat. No. 7,684,067) entitled APPROACH FOR SECURELY PROCESSING AN ELECTRONIC DOCUMENT, filed Sep. 13, 2006, the contents of which is incorporated by reference for all purposes as if fully set forth herein.

This application is related to U.S. patent application Ser. No. 11/520,955 (U.S. Pat. No. 8,151,363) entitled APPROACH FOR SECURELY PROCESSING AN ELECTRONIC DOCUMENT, filed Sep. 13, 2006, the contents of which is incorporated by reference for all purposes as if fully set forth herein.

FIELD OF THE INVENTION

The present invention relates to processing electronic documents in a secure manner.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A document-processing device is any device that processes either a printed copy of a document or an electronic copy of a document. A document-processing device may produce a printed copy of a document based on either an electronic copy of the document or another printed copy of the document. A document-processing device may also produce an electronic copy of a document based on either another electronic copy of the document or a printed copy of the document. Non-limiting, illustrative examples of a document-processing device include a printer, a scanner, a facsimile machine, a copier, and a multi-function peripheral (MFP).

In certain environments in which a document-processing device may be used, ensuring a certain level of security may be required or at least desirable. For example, the document-processing device may process documents containing sensitive information whose access needs to be restricted. The document-processing device may also be deployed in an environment in which it is desirable to monitor the activities of how the document-processing device is used as well as to verify that certain activities took place.

SUMMARY OF INVENTION

Approaches are discussed herein for processing electronic documents in a secure manner. In an embodiment, a scanner may verify that the configuration state of a file server has not changed since a prior configuration state. For example, an administrator may register a file server with a security server. A scanner may thereafter issue a request to the security server to determine if the configuration state of the file server has changed since the file server was registered with the security server. The configuration state of the file server may reflect any way in which the file server may be configured, e.g., the configuration state of the file server may include a security state of the file server. In this way, a scanner may verify that the security configuration of the file server has not changed since the file server was registered with the security server, thereby providing the scanner an assurance that the security of the file server has not been compromised.

In another embodiment, the security server may be used to verify that certain events took place. For example, the security server may be used to verify that a particular scanner issued a request to store a particular electronic document to a particular file server or that a particular file server received a request, from a particular scanner, to store a particular electronic document.

In a further embodiment, a storage medium of a file server may be protected against unauthorized access. A password, used to control access to the storage medium, is stored at the file server in a location separate from the storage medium. The storage medium is configured to require receipt of the password to access the storage medium. Upon powering on the file server, the password is provided by the file server to the storage medium, without user input, to allow the file server to access the storage medium. In this way, if the storage medium is removed without authorization from the file server, the storage medium cannot be accessed because the storage medium requires receipt of the password to access the storage medium.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 1B is a block diagram illustrating of an illustrative system according to a second embodiment of the invention;

FIG. 1C is a block diagram illustrating of an illustrative system according to a third embodiment of the invention;

FIG. 2 is a flowchart illustrating the functional steps of determining whether a configuration state of a printing device has changed;

FIG. 3 is a flowchart illustrating the functional steps of verifying that a document-processing device has received a request, to process an electronic document, from a particular client according to an embodiment of the invention;

FIG. 8A is a block diagram illustrating of an illustrative system according to a first embodiment of the invention;

FIG. 8B is a block diagram illustrating of an illustrative system according to a second embodiment of the invention;

FIG. 8C is a block diagram illustrating of an illustrative system according to a third embodiment of the invention;

FIG. 13, which is a block diagram of an illustrative file server according to an embodiment of the invention;

FIG. 14A is a block diagram illustrating of an illustrative system according to a first embodiment of the invention;

FIG. 14B is a block diagram illustrating of an illustrative system according to a second embodiment of the invention;

FIG. 20A is a block diagram illustrating of an illustrative system according to a first embodiment of the invention;

FIG. 20B is a block diagram illustrating of an illustrative system according to a second embodiment of the invention;

FIG. 20C is a block diagram illustrating of an illustrative system according to a third embodiment of the invention;

DETAILED DESCRIPTION

In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

Overview

Various approaches are presented herein for processing electronic documents in a secure manner. The approaches discussed herein are applicable to a wide array of contexts. Four illustrative contexts shall be discussed herein, namely the context of a client communicating with a document-processing device (denoted the client/DPD context), the context of a scanner communicating with a file server (denoted the scanner/file server context), the context of a facsimile machine communicating with another facsimile machine (denoted the fax/fax context), and the context of a standalone document-processing device (denoted the standalone DPD context).

System Overview of the Client/DPD Context

In the client/DPD context, a user may use a client to communicate with a document-processing device. According to one approach for processing electronic documents in a secure manner, a client may verify that the configuration state of a document-processing device has not changed since the document-processing device was registered with a security server. Embodiments of the invention may implement the functions performed by the security server differently, as explained in further detail below.

Figure 1A:
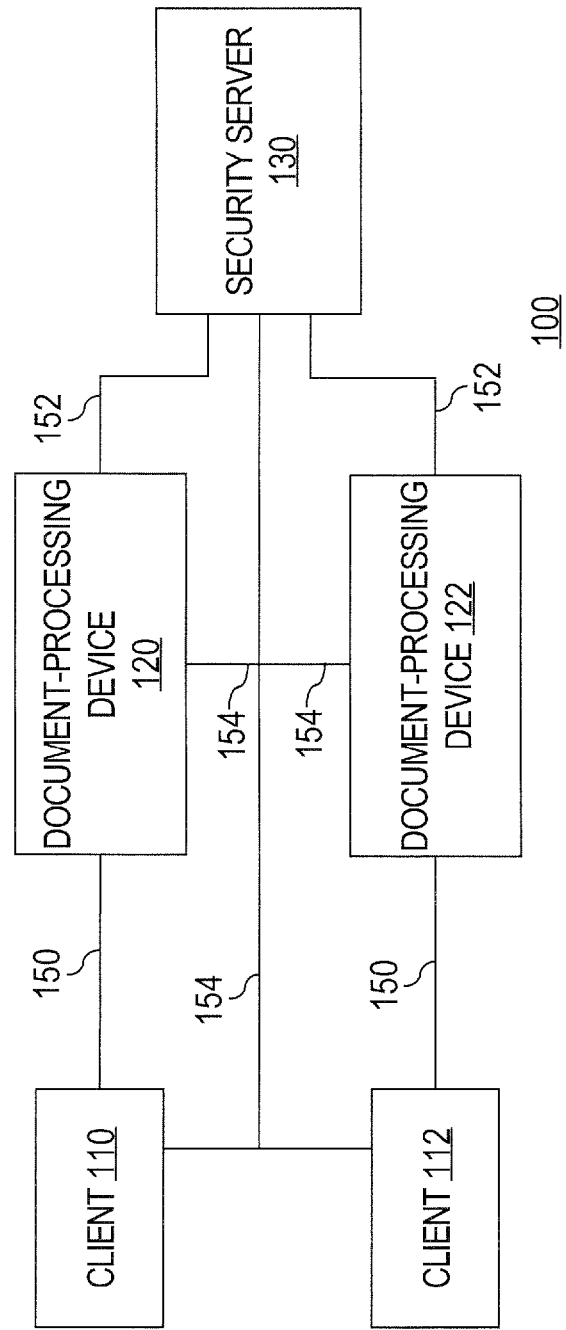
FIG. 1A is a block diagram illustrating of an illustrative system according to a first embodiment of the invention.

FIG. 1A is a block diagram illustrating of an illustrative system 100 according to an embodiment of the invention. System 100 of FIG. 1A comprises clients 110 and 112, document-processing devices 120 and 122, security server 130, and communications links 150, 152, and 154.

A client, such as client 110 and client 112, as used herein, represents any device that is capable of issuing a request to process a document to a document-processing device over communications link 150. Non-limiting, illustrative examples of a client include a software application, a personal computer (PC), a wireless device, and a cell phone. While only two clients are depicted in FIG. 1A for ease of explanation, system 100 may include any number of clients, including one client and a plurality of clients.

A document-processing device, such as document-processing device 120 and document-processing device 122, as used herein, represents any device that processes either a printed copy of a document or an electronic copy of a document. Non-limiting, illustrative examples of a document-processing device include a printer, a scanner, a facsimile machine, a copier, and a multi-function peripheral (MFP). While only two document-processing devices are depicted in FIG. 1A for ease of explanation, system 100 may include any number of document-processing devices, including one document-processing device and a plurality of document-processing devices.

Security server 130 represents a device that is (a) capable of communicating with a client over communications link 154 and (b) capable of communicating with a document-processing device over communications link 152. Security server 130 is configured to perform security functionality. For example, security server 130 may service requests from clients to determine if the configuration state of a particular document-processing device has changed since the particular document-processing device was registered with security server 130. Security server 130 may also be used in verifying that certain actions performed in system 100 took place, such as a client issuing a request to process a document to a document-processing device. The actions performed by security server 130 shall be described in further detail below.

Communications link 150 may be implemented by any medium or mechanism that provides for the exchange of data between a client and a document-processing device. Communications link 152 may be implemented by any medium or mechanism that provides for the exchange of data between a document-processing device and a security server. Communications link 154 may be implemented by any medium or mechanism that provides for the exchange of data between a client and a security server. Non-limiting, illustrative examples of communications links 150, 152, and 154 include a network such as a Local Area Network (LAN), Wide Area Network (WAN), Ethernet or the Internet, or one or more terrestrial, satellite or wireless links.

In some embodiments of the invention, the functions performed by security server 130 may be implemented on a device that is physically connected to a document-processing device. FIG. 1B is a block diagram illustrating of an illustrative system 160 according to such an embodiment of the invention. As shown in FIG. 1B, security module 168 is implemented on a pluggable device 166 that is physically connected (or "plugged in") to document-processing device 164 over communications link 170. Security module 168 corresponds to a functional component, such as a set of executable software instructions, on pluggable device 166 that performs the functions described herein as being performed by security server 130. While FIG. 1B depicts pluggable device 166 physically connected to a single document-processing device, in other embodiments of the invention, pluggable device 166 may be physically connected to two or more document-processing devices.

In other embodiments of the invention, the functions performed by security server 130 may be implemented on a client. FIG. 1C is a block diagram illustrating of an illustrative system 180 according to such an embodiment of the invention. As shown in FIG. 1C, security module 186 resides on client 182. Security module 186 corresponds to a functional component, such as a set of executable software instructions, on client 182 that is configured to perform the functions described herein as being performed by security server 130. In other embodiments of the invention (not depicted), security module 186 may be implemented on document-processing device 184.

Having described several illustrative systems, the process of verifying the configuration state of a document-processing device according to an embodiment shall now be described.

Verifying the Configuration State of a Document-Processing Device in the Client/DPD Context FIG. 2 is a flowchart illustrating the functional steps of determining whether a configuration state of a printing device has changed. For ease of explanation, the functional steps of FIG. 2 shall be explained below with reference to FIG. 1A. However, in other embodiments of the invention, the functions performed by security server 130 may be performed instead by a security module residing on a pluggable device, a client, or a document-processing device.

In step 210, first state data that describes a first configuration state of a document-processing device is received. A user, such as an administrator, may wish to register a particular document-processing device with security server 130. The act of registering a particular document-processing device with security server 130 involves retrieving first state data from the particular document-processing device, and storing the first state data with security server 130. For purposes of providing a clear example, the steps of FIG. 2 shall be explained below with reference to receiving first state data in step 210 that describes a first configuration state of document-processing device 120.

An administrator may use client 112 to send a request, to register document-processing device 120, to security server 130. In response to security server 130 receiving the request, security server 130 sends a request for the first state data to document-processing device 120. After document-processing device 120 receives the request from security server 130 for the first state data, document-processing device 120 prepares the first state data and transmits the first state data to security server 130.

The first state data may describe any configuration state of document-processing device 120. For example, the first state data may describe a security state of document-processing device 120. In other words, the first state data may identify the manner in which the security settings of document-processing device 120 are configured at the time when document-processing device 120 is registered with security server 130.

In an embodiment, document-processing device 120 may create the first state data using a hash function and/or a seed to obtain a hash value to use as the first state data. Such an approach may be advantageous, as it provides a level of encryption for the first state data, since the current configuration of document-processing device 120 cannot be inferred from inspecting the hash value. In such an embodiment, the first state data may be generated by document-processing device 120 (a) determining a set of configuration information that describes the configuration state of document-processing device 120, (b) hashing the configuration information using a hash function and/or a seed to obtain a hash value, and (c) using the hash value as the first state data. The hash function and/or the seed may be provided to document-processing device in the request for the first state data sent from security server 130, in a separate message from security server 130, or an administrator may provide the hash function and/or the seed to document-processing device 120. If security server 130 does not provide document-processing device 120 with the hash function and/or seed, then the hash function and/or seed used to encrypt the first state data may also be stored at security server 130.

Instead of or in addition to encrypting the first state data using a hash function, document-processing device 120 may encrypt the first state data using other approaches as well. For example, the first state data may be encrypted by document-processing device 120 using a public key associated with security server 130, and thereafter the first state data may be decrypted by security server 130 using a private key associated with security server 130. After security server 130 receives the first state data, processing proceeds to step 220.

In step 220, a request for second state data is sent by security server 130 to document-processing device 120. The request of step 220 may be performed in response to client 110 sending, to security server 130, a request to verify that the configuration state of document-processing device 120 has not changed since document-processing device 120 was registered with security server 130. The request to verify that the configuration state of document-processing device 120 may be sent automatically by client 110 after the occurrence of an event (such as when client 110 is powered on) or upon request of a user of client 110. Such a request may be advantageous to ensure that a particular document-processing device, to which client 110 wishes to send a request to process an electronic document, is secure. In this way, if the configuration state of a particular document-processing device has changed since it was registered with security server 130, then client 110, or a user of client 110, may determine that it may be too risky to issue a request to process an electronic document to that document-processing device since its configuration state has changed since it was registered; consequently, another document-processing device may be selected, either by client 110 or the user of client 110, to service a request to process the electronic document.

Second state data is data that describes a second configuration state of document-processing device 120. The second configuration state described by the second state data corresponds to the current configuration state of document-processing device 120.

In an embodiment, the request for second state data that is sent by security server 130 in step 220 is encrypted. For example, security server 130 may encrypt the request of step 220 using a public key associated with document-processing device, and upon receiving the request of step 220, document-processing device 120 can decrypt the request using a private key associated with document-processing device 120. After the request for the second state data is sent from the security server 130 to document-processing device 120, processing proceeds to step 230.

In step 230, the second state data is received from document-processing device 120 by security server 130. In an embodiment, the second state data may be encrypted by document-processing device 120 using the same techniques discussed above with reference to encrypting the first state data, e.g., the second state data may be encrypted using (a) a hash function and/or a seed and/or (b) a public key associated with security server. Thereafter, processing proceeds to step 240.

In step 240, the first state data received in step 210 and the second state data received in step 230 are compared by security server 130 to determine if the first state data and the second state data identify the same configuration state. If the first state data and the second state data identify the same configuration state, then the configuration state of document-processing device 120 has not changed since document-processing device 120 was registered. However, if the first state data and the second state data do not identify the same configuration state, then the configuration state of document-processing device 120 has changed since document-processing device 120 was registered. If the configuration of document-processing device 120 has changed since it was registered with security server 130, then the possibility exits that the change in configuration may result in document-processing device 120 being less secure.

If the configuration of document-processing device 120 has not changed since it was registered with security server 130, the first state data and the second state data are identical. For example, if the first state data and the second state data were created using a hash function and/or a seed, then the hash value for each of the first state data and the second state data should be the same, since the configuration information used to create the hash value in each case is the same. However, if the configuration information changed since document-processing device 120 was registered with security server 130, then the hash value of the second state data should be different than the hash value of the first state data, since the input to the hash function used to create the hash value in each case is different. After the first state data and the second state data are compared, processing proceeds to step 250.

In step 250, a message, indicating whether the configuration state of the document-processing device has changed, is transmitted by security server 130 to client 110. In an embodiment, upon client 110 receiving the message, client 110 may present the message to the user of client 110 to allow the user of client 110 to take some action, e.g., the user may subsequently instruct client 110 to issue a request to process an electronic document to document-processing device 120 anyway or may instruct client 110 to issue a request to process an electronic document to a different document-processing device.

In another embodiment, client 110 may be configured to interpret the message of step 250 to perform an action without presenting the message to the user. For example, in an embodiment, if client 110 reads the message of step 250, and the message indicates that the configuration state of the document-processing device 120 has changed, then client 110 may not allow the user of client 110 to issue a request to process an electronic document to document-processing device 120 and/or present a recommendation to the user of client 110 that the user of client 110 issue a request to process an electronic document to another document-processing device besides document-processing device 120.

Advantageously, a client may verify whether the configuration state of a document-processing device has been changed since the document-processing device has been registered with a security server. In this way, the client can determine whether a potential security risk exists due to a change in the configuration state of a document-processing device. Thus, if a client determines that the configuration state of a document-processing device has changed since the document-processing device was registered, then the client may perform one or more actions, as described above.

Verifying that a Document-Processing Device has Received a Request to Process an Electronic Document in the Client/DPD Context According to another approach for processing electronic documents in a secure manner, the receipt of a request, from a particular client, to a particular document-processing device, to process a particular electronic document may be verified. FIG. 3 is a flowchart illustrating the functional steps of verifying that a particular document-processing device has received a request, to process a particular electronic document, from a particular client according to an embodiment of the invention. For ease of explanation, the functional steps of FIG. 3 shall be explained below with reference to FIG. 1A. For purposes of providing a clear example, the steps of FIG. 3 shall be explained with reference to verifying that document-processing device 122 received a request, to process document ABC, from client 110.

In step 310, receipt verification data is received from document-processing device 122 by security server 130. Each time a document-processing device receives a request to process an electronic document from a client, the document-processing device may send receipt verification data to security server 130. The receipt verification data is data that indicates that a request, from a particular client, to process a particular electronic document at a particular document-processing device, was received by the particular document-processing device. Thus, in this example, the receipt verification data received in step 310 indicates that a request, from client 110, to process document ABC at document-processing device 122, was received by document-processing device 122. In some embodiments, receipt verification data may also contain other information about the request received by a document-processing device, e.g., the receipt verification data may also include a timestamp of when the request was received.

In an embodiment, document-processing device 122 may generate the receipt verification data to include information that identifies (a) document-processing device 122, (b) client 110, and (c) document ABC. Information contained in the receipt verification data that identifies document ABC may be generated by document-processing device 122 by applying a hash function to document ABC to generate a hash value.

In an embodiment, document-processing device 122 may encrypt the receipt verification data using any mechanism for encrypting data that security server 130 can decrypt. For example, document-processing device 122 may encrypt receipt verification data using a pubic key associated with security server 130, and security server 130 may decrypt receipt verification data using a private key associated with security server 130.

In an embodiment, the receipt verification data may include an encrypted copy of document ABC. As explained in further detail below, the encrypted copy of document ABC may be subsequently used by security server 130 in verifying that document-processing device 122 received the request from client 110 to process document ABC and in verifying the contents of document ABC.

In an embodiment, document-processing device 122 may send the receipt verification data to security server 130 in response to receiving the request to process document ABC from client 110. In another embodiment, document-processing device 122 may delay sending the receipt verification data to security server 130 for a configurable period of time or until a configurable number of requests to process documents have been received by document-processing device 122 so that receipt verification data for multiple requests may be sent from document-processing device 122 to security server 130 in a batch process or in single communication. After the receipt verification data is received from document-processing device 122, processing proceeds to step 320.

In step 320, request verification data is received from client 110 by security server 130. Request verification data is data that indicates that a particular client has issued a request to process a particular electronic document to a particular document-processing device. Thus, in this example, the request verification data received in step 320 indicates that client 110 has issued a request to process document ABC to document-processing device 122. Client 110 may transmit the request verification data to security server 130 in response to issuing the request to process a document identified by the request verification data. In other words, each time a client issues a request to process a document to a document-processing device, the client may also send request verification data to security server 130. In some embodiments, request verification data may also contain other information about a request, to process a document, issued by a client, e.g., the request verification data may also include a timestamp of when the request was issued.

In an embodiment, client 110 may generate the request verification data to include information that identifies (a) document-processing device 122, (b) client 110, and (c) document ABC. Information contained in the request verification data that identifies document ABC may be generated by client 110 by applying a hash function to document ABC to generate a hash value. In such an approach, the hash function used by client 110 is the same hash function used by document-processing device 122. As a result, the hash value computed by client 110 to identify document ABC should be the same as the hash value computed by document-processing device to identify document ABC.

Client 110 may encrypt request verification data using any mechanism for encrypting data that security server 130 can decrypt. For example, client 110 may encrypt request verification data using a public key associated with security server 130, and security server 130 may decrypt request verification data using a private key associated with security server 130. After security server receives the request verification data, processing proceeds to step 330.

In step 330, security server 130 determines whether the receipt verification data and the request verification data identify the same request to process an electronic document. Security server 130 may make this determination by inspecting the receipt verification data and the request verification data, although it may be necessary to decrypt the receipt verification data and the request verification data prior to inspection.

Embodiments may perform the comparison of step 330 in a variety of different approaches. According to one approach, all sets of receipt verification data and all sets of request verification data received by security stored are stored for a configurable amount of time by security server 130. Security server 130 may, upon receiving receipt verification data, determine if a set of request verification data that identifies the same request as the receipt verification data has been received. Similarly, security server 130 may, upon receiving request verification data, determine if a set of receipt verification data that identifies the same request as the request verification data has been received. In another approach, upon receiving either the receipt verification data or the request verification data, security server 130 may wait a configurable period of time before determining if a corresponding set of receipt verification data or request verification data has been received to allow enough time for the corresponding set of receipt verification data or request verification data to be received by security server 130.

In an embodiment wherein receipt verification data and request verification data is stored by security server 130 for a configurable period of time, a client may issue, to security server 130, a request to verify that a document-processing device received a request to process an electronic document some time after the client issued the request to the document-processing device. The client may issue a request ("a verification request") to verify whether the document-processing device received the request. The verification request from the client includes information to identify the particular request being verified, e.g., the request may include the request verification data. Security server 130 may then determine if any stored receipt verification data identifies the same request to process an electronic document as the request to process an electronic document identified by the verification request.

In an embodiment, if document-processing device 122 sent an encrypted copy of document ABC to security server 130 as part of the receipt verification data, then security server 130 may perform a three-way comparison between the receipt verification data, the request verification data, and server verification data. Server verification data is data that is generated by security server 130 from the copy of the document received from document-processing device 120. For example, if the receipt verification data and the request verification data each contain a hash value identifying document ABC, then security server 130 may apply the hash function to document ABC to generate its own hash value. Security server 130 may then compare the hash value contained in the receipt verification data, the hash value contained in the request verification data, and the hash value generated by security server 130 to ensure that each identifies the same document. After the comparison of step 330 is performed, processing proceeds to step 340.

In step 340, confirmation data, that indicates whether document-processing device 122 received a request, from client 110, to process document ABC, is sent from security server 130 to client 110. Advantageously, security server 130 may verify, either upon request or automatically after security server 130 receives either request verification data or receipt verification data, to client 110 that a particular document-processing device received the request to process a document from client 110.

Additionally, if document-processing device 122 sent an encrypted copy of document ABC to security server 130 as part of the receipt verification data, security server 130 may store the electronic document for a configurable period of time. In this way, security server 130 may provide a copy of the electronic document to a requestor in response to receiving a request for the electronic document and/or in response to a verification request.

In an embodiment, in addition to verifying that a particular document-processing device received a particular request to process an electronic document from a particular client, information stored at security server 130 may be used in servicing requests from clients to obtain other information about requests to process the document, such as when a particular document-processing device received a particular request to process a particular electronic document from a particular client. Having described an approach for verifying whether a document-processing device received a particular request to process an electronic document, techniques will now be discussed for verifying whether a client issued a particular request to process an electronic document.

Figure 4:
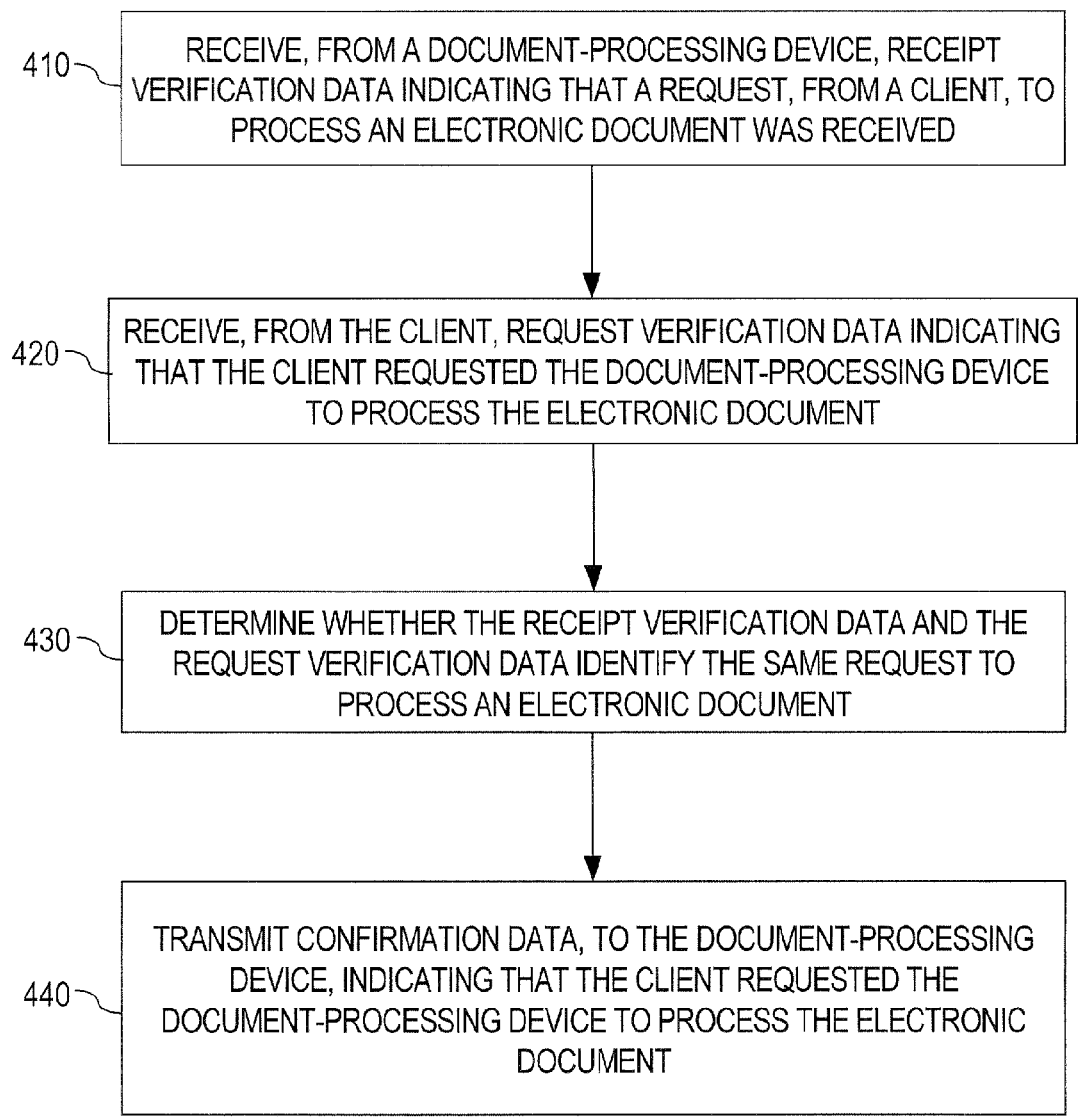
FIG. 4 is a flowchart illustrating the functional steps of verifying that a client requested an electronic document to be processed by a particular document-processing device according to an embodiment of the invention.

Verifying that a Client Issued a Request to Process an Electronic Document to a Document-Processing Device in the Client/DPD Context According to another approach for processing electronic documents in a secure manner, the issuance of a request to process a particular electronic document, by a particular client, to a particular document-processing device, may be verified. FIG. 4 is a flowchart illustrating the functional steps of verifying that a client requested an electronic document to be processed by a particular document-processing device according to an embodiment of the invention. For ease of explanation, the functional steps of FIG. 4 shall be explained below with reference to FIG. 1A. For purposes of providing a clear example, the steps of FIG. 4 shall be explained with reference to verifying that client 110 issues a request to process document ABC to document-processing device 122.

Steps 410, 420, and 430 of FIG. 4 are similar to those discussed above with respect to steps 310, 320, and 330 of FIG. 3 respectively. After the performance of step 430, processing proceeds to step 440.

In step 440, confirmation data, that indicates client 110 requested document-processing device 122 to process document ABC, is sent from security server 130 to another entity, such as document-processing device 122. In this way, the other entity, such as document-processing device 122, may verify that client 110 issued the request to process document ABC that was received by document-processing device 122. Document-processing device 122 may store received confirmation data for a configurable period of time. In this way, document-processing device 122 may prove the identity of client that sent requests to document-processing device 122. For example, document-processing device 122 may provide a mechanism to a user, such as an administrator, to enable the user to access information about which clients issued requests to document-processing device 122 and information about those requests.

Additionally, client 112 may issue a request to security server 130 to verify that client 110 issued a particular request to document-processing device 122. In this way, clients may issue requests to security server 130 to verify that other clients issued a particular request to process an electronic document to a particular document-processing device. Such requests may need to be authenticated or be associated with a certain level of permission before the request is processed by security server 130.

In an embodiment, in addition to verifying that a particular client issued a particular request to a particular document-processing device, information stored at security server 130 may be used to service a request, from a client, to determine additional information, such as when a particular client issued a particular request, to process a document, to a particular document-processing device.

Having described an approach for verifying whether a client issued a particular request to process an electronic document, techniques will now be discussed for protecting a storage device of a printing device according to an embodiment of the invention.

Protecting a Storage Device of a Printing Device in the Client/DPD Context

Figure 5:
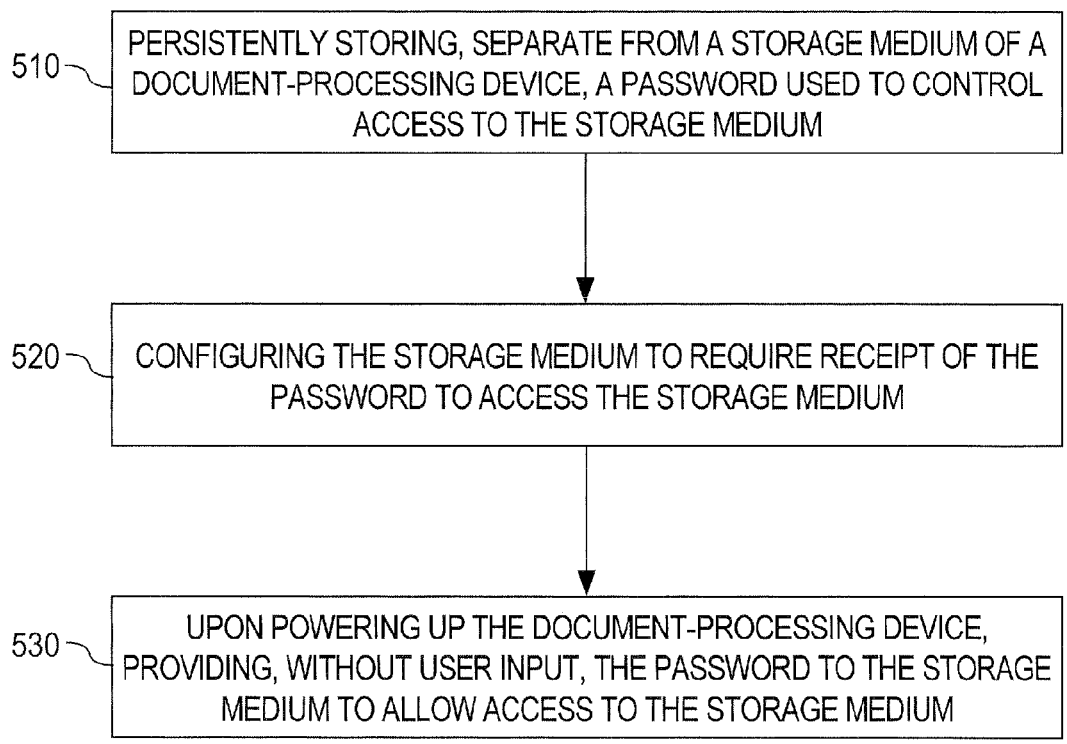
FIG. 5 is a flowchart illustrating the functional steps of protecting a storage medium of a document-processing device according to an embodiment of the invention.

According to another approach for processing electronic documents in a secure manner, a storage medium of a document-processing device, may be protected against unauthorized access. FIG. 5 is a flowchart illustrating the functional steps of protecting a storage medium of a document-processing device according to an embodiment of the invention. For ease of explanation, the steps of FIG. 5 shall be explained below with reference to FIG. 6, which is a block diagram of an illustrative document-processing device 610 according to an embodiment of the invention.

Document-processing device 610 comprises protected storage medium 620 and password storage medium 630. Protected storage medium 620 represents a persistent storage of document-processing device 610 that may be used to store sensitive information, such as information about the electronic documents that have been processed by document-processing device 610. A non-limiting, illustrative example of protected storage medium 620 includes a hard drive.

Password storage medium 630 represents a persistent storage of document-processing device 610 that may be used to store password 632. Although any mechanism for persistently storing data may be used to implement password storage medium 630, the capacity of password storage medium 630 need only be a large as to accommodate the persistent storage of password 632. A non-limiting, illustrative example of password storage medium 630 is flash memory. Password storage medium 630 may also be embodied as the storage medium storing the BIOS of document-processing device 610, as password 632 may also be stored by the BIOS of document-processing device 610.

Password 632 may be implemented using any data that may be used to control access to storage medium.

In step 510 of FIG. 5, password 632 is persistently stored separate from the storage medium. For example, password 632 may be stored in password storage medium 630.

In step 520, protected storage medium 620 is configured to require receipt of password 632 to access protected storage medium 620. As a result of configuring protected storage medium 620 to require receipt of password 632 to access protected storage medium 620, an entity cannot access protected storage medium 620 without providing password 632 to protected storage medium.

In an embodiment, protected storage medium 620 may be embodied using an Advanced Technology Attachment (ATA)

hard drive. An ATA hard drive has a hard drive controller that is located on the ATA hard drive. The drive controller of an ATA hard drive may be configured to require receipt of a password in order to access the ATA hard drive. Thus, an ATA hard drive controller may be instructed in step 520 to require receipt of password 632 to allow access to protected storage medium 620.

In an embodiment, document-processing device 610 may automatically configure protected storage medium 620 to require receipt of password 632 to access protected storage medium in response to document-processing device 610 receiving a request to power down. In this way, protected storage medium 620 is "locked," in that if protected storage medium 620 is removed from document-processing device 610 prior to document-processing device 610 powering on, password 632 must be provided to protected storage medium 620 to access protected storage medium 620.

In step 530, upon powering up document-processing device 610, document-processing device 610 provides password 632 to protected storage medium 620 without user input, thereby "unlocking" protected storage medium 620. As document-processing device 610 provides password 632 to protected storage medium 620 upon powering up, document-processing device 610 may access protected storage medium 620.

Embodiments of the invention may advantageously be used to "lock" protected storage medium 620 when document-processing device 610 is powered down, thereby preventing unauthorized access to protected storage medium 620. As protected storage medium 620 is locked and unlocked without requiring any input or intervention from a user, the protection of protected storage medium 620 is transparent to a user of document-processing device 610. If sensitive information is stored on protected storage medium 620, and if protected storage medium 620 is removed when document-processing device 610 is powered down, then protected storage medium 620 cannot be accessed unless password 632 is provided, thereby providing any security that the sensitive information stored on protected storage medium 620 cannot be access by unauthorized personnel.

In an embodiment, the password used to control access to protected storage medium 620 may be changed each time document-processing device 610 is powered on. In such an embodiment, upon powering up document-processing device 610, a new password used to control access to protected storage medium 620 is generated. Thereafter, protected storage medium 620 is configured to (a) require receipt of the new password to allow access the protected storage medium 620, and (b) no longer require receipt of the previous password to allow access the protected storage medium 620.

In an embodiment, a master password may be used. A master password is a password which protected storage medium 620 will accept to provide access to protected storage medium 620. The drive controller of protected storage medium 620 may be configured to allow access to protected storage medium 620 if the master password is provided. In this way, if an administrator of document-processing device 610 needs to access protected storage medium 620, the administrator may access protected storage medium 620 with the master password. Such an embodiment is advantageous, as password 632 may be changed each time document-processing device 610 is powered on as explained above. In this way, if document-processing device 610 fails or a problem occurs in which document-processing device 610 is unable to retrieve password 632 from password storage medium 630, the administrator may use the master password to access protected storage medium 620. Thus, even though password 632 may not be retrievable from protected storage medium 620, the administrator may still gain access to protected storage medium 620 using the master password.

In an embodiment, an administrator may configure the operation of protected storage medium 620 by supplying the master password to the drive controller of protected storage medium 620. One manner in which the administrator may configure protected storage medium 620 is to (a) not permit data from being read from protected storage medium 620 by any entity other than document-processing device 610, but (b) allow data stored on protected storage medium 620 to be deleted. Such a configuration may be used when there is no need to recover the data stored on protected storage medium 620. For example, many document-processing devices only store documents for purposes of processing, and do not allow subsequent retrieval of stored document by other devices.

Inquiring about a User's Job Status in the Client/DPD Context

In an embodiment, a user may send a message to a document-processing device to obtain information about a job status. A user's job status, as used herein, generally refers to information about a request to process an electronic document that the user submitted to a document-processing device. A user's job status may include information about requests that are currently being processed by a document-processing device and may include information about requests that have already been processed by a document-processing device. In this way, a user may retrieve information about requests to processing electronic documents that the user previously sent to a document-processing device. In an embodiment, a user who is not an administrator may only inquiry about his own job status.

To illustrate the operation an embodiment of the invention, initially a user may user client 110 to send a status inquiry message to document-processing device 120. The status inquiry message contains identification information for the user that uniquely identifies the user, e.g., the identification information may include the user's username or other unique identifier. Additionally, the status inquiry message may identify those requests that the user is interested in receiving status information. For example, the status inquiry message may identify that the user wishes to receive status information only for pending requests or for requests that the user sent within a bounded period of time.

Upon receiving the status inquiry message, document-processing device 120 retrieves status information for the user in accordance with the status inquiry message. In an embodiment, document-processing device 120 uses the identification information contained in the status inquiry message to retrieve records containing the requested status information, which may be stored at document-processing device 120 or at security server 130. After retrieving the records containing the requested status information, document-processing device 120 sends the records containing the requested status information to client 110. Client 110 may then display the records containing the requested status information to the user.

In an embodiment, the records containing the status information may be stored (either at document-processing device 120 or at security server 130) in an encrypted manner, e.g., the records may be encrypted using the user's public key, and the user may decrypt the records using their private key. In an alternate embodiment, prior to returning the records to the user, document-processing device 120 may encrypt the records containing the requested status information. Other mechanisms for encrypting the records may be employed by other embodiments of the invention.

In an embodiment, an administrator may inquiry about the job status of any user. For example, an administrator may send a status inquiry message to document-processing device that requests the status of any number of users, including two or more users. Thus, an administrator may inquiry about the job status of another user besides the administrator. In such an embodiment, the status inquiry message sent by the administrator would contain identification information that uniquely identifies one or more users. In response to receiving the status inquiry message from an administrator, a document-processing device retrieves status information for each user identified in the status inquiry message, and thereafter sends the status information to the client from which the administrator sent the status inquiry message.

In an embodiment, prior to an administrator sending a status inquiry message that inquires about the status or another user, an administrator may need to be authenticated at the client. Alternately, prior to a document-processing device processing a status inquiry message, from an administrator, which inquires about the status or another user, the administrator may need to be authenticated at the document-processing device.

Verifying the Capabilities of a Document-Processing Device in the Client/DPD Context In an embodiment, a client may verify that a particular document-processing device supports a particular feature. For example, a user may only wish to issue to a request to print an electronic document to a document-processing device that supports a desired security feature. Thus, an embodiment of the invention may be employed to confirm that a document-processing device supports the desired security feature prior to issuing a request to print the electronic document to the document-processing device.

To illustrate how an embodiment of the invention works in further detail, prior to client 110 sending a request to process an electronic document to document-processing device 120, client 110 sends a capability request message to document-processing device 120. Upon receiving the capability request message, document-processing device 120 sends capability information to client 110. The capability information describes the current capabilities of document-processing device 120 with respect to processing documents. For example, the capability information may describe the current security features of which document-processing device 120 is configured to provide.

Upon client 110 receiving the capability information from document-processing device 120, client 110 determines if the current capabilities of document-processing device 120 satisfy the desired requirements for a request to process an electronic document. If the current capabilities of document-processing device 120 do satisfy the desired requirements for a request to process an electronic document, then client 110 notifies the user that the desired capabilities were obtained, and sends the request to process the electronic document to document-processing device 120.

However, if the current capabilities of document-processing device 120 do not satisfy the desired requirements for a request to process an electronic document, then client 110 sends a change request, to document-processing device 120, to change the current capabilities of document-processing device 120 so that the capabilities satisfy the desired requirements for a request to process an electronic document. For example, the change request may specify that the security settings of document-processing device 120 be updated so that document-processing device 120 is configured to support a specified security feature. In response, document-processing device 120 will send, to client, a message indicating whether the current capabilities of document-processing device 120 may be updated in the manner requested by client 110 in the change request.

If the current capabilities of document-processing device 120 may be updated in the manner requested by client 110 in the change request, then client 110 reports to the user that the desired capabilities were obtained, and sends a message to document-processing device instructing document-processing device 120 to update its current capabilities in the manner requested by client 110 in the change request. In addition, thereafter client 110 sends the request to process the electronic document to document-processing device 120.

On the other hand, if the current capabilities of document-processing device 120 may not be updated in the manner requested by client 110 in the change request, then client 110 reports to the user that the desired capability were not obtained, and client 110 may await further instruction from the user. For example, the user may specify another document-processing device 120 to which a request to process an electronic document is to be sent, or may update the set of desired capabilities which are needed to process the electronic document. In this way, client 110 may be assured that the electronic document is processed by a document-processing device with the desired capability.

System Overview of the Scanner/File Server Context

In the scanner/file server context, a user may use a scanner to scan a printed version of a document to produce an electronic version of the document, and thereafter store the electronic version of the document using a file server. According to one approach for processing electronic documents in a secure manner, a user may verify that the configuration state of the file server has not changed since the file server was registered with a security server. Embodiments of the invention may implement the functions performed by the security server differently, as explained in further detail below.

FIG. 8A is a block diagram illustrating of an illustrative system 800 according to an embodiment of the invention. System 800 of FIG. 8A comprises scanner 810, file server 820, and communications links 850, 852, and 854.

Scanner 810 represents any device that is capable of processing a printed version of a document to produce an electronic version of the document. In an embodiment, scanner 810 may be a standalone scanner that provides a user interface for a user to interact with the scanner. In another embodiment, scanner 810 may be part of a document-processing device that provides a user interface for a user to interact with the document-processing device. In another embodiment, scanner 810 may be a scanner that is operationally connected to a personnel computer (PC). In such an embodiment, the user may interact with the scanner using the user interface provided by the PC. While only one scanner is depicted in FIG. 8A for ease of explanation, system 800 may include any number of scanners.

A file server, such as file server 820, represents any device that is capable of storing a document in a file system. In an embodiment, file server 820 may also include an email server, which is a component that is capable of sending and receiving email. Consequently, in such an embodiment, file server 820 may be able to store electronic documents as well as send and receive electronic documents via email. While only one file server is depicted in FIG. 8A for ease of explanation, system 800 may include any number of file servers.

Security server 830 represents a device that is (a) capable of communicating with scanner 810 over communications link 852 and (b) capable of communicating with file server 820 over communications link 854. Security server 830 is configured to perform security functionality. For example, security server 830 may service requests from users to determine if the configuration state of file server 820 has changed since file server 820 was registered with security server 830. Security server 130 may also be used in verifying that certain actions performed in system 800 took place, such as a user issuing a request to process a printed version of a document to scanner 810. The actions performed by security server 830 shall be described in further detail below.

Communications link 850 may be implemented by any medium or mechanism that provides for the exchange of data between scanner 810 and file server 820. Communications link 852 may be implemented by any medium or mechanism that provides for the exchange of data between scanner 810 and security server 830. Communications link 854 may be implemented by any medium or mechanism that provides for the exchange of data between file server 820 and security server 830. Non-limiting, illustrative examples of communications links 850, 852, and 854 include a network such as a Local Area Network (LAN), Wide Area Network (WAN), Ethernet or the Internet, or one or more terrestrial, satellite or wireless links.

In some embodiments of the invention, the functions performed by security server 830 may be implemented on a device that is physically connected to a file server. FIG. 8B is a block diagram illustrating of an illustrative system 860 according to such an embodiment of the invention. As shown in FIG. 8B, security module 868 is implemented on a pluggable device 866 that is physically connected (or "plugged in") to file server 864 over communications link 870. Security module 868 corresponds to a functional component, such as a set of executable software instructions, on pluggable device 866 that performs the functions described herein as being performed by security server 830. While FIG. 8B depicts pluggable device 866 physically connected to a single file server, in other embodiments of the invention, pluggable device 866 may be physically connected to two or more file servers. In another embodiment of the invention, pluggable device 866 may be operationally connected to scanner 862 instead of file server 864.

In other embodiments of the invention, the functions performed by security server 830 may be implemented directly on a file server. FIG. 8C is a block diagram illustrating of an illustrative system 880 according to such an embodiment of the invention. As shown in FIG. 8C, security module 886 resides on file server 882. Security module 886 corresponds to a functional component, such as a set of executable software instructions, on file server 882 that is configured to perform the functions described herein as being performed by security server 830. In other embodiments of the invention (not depicted), security module 886 may be implemented on a scanner 884 instead of file server 882.

Having described several illustrative systems, the process of verifying the configuration state of a document-processing device according to an embodiment shall now be described.

Figure 9:
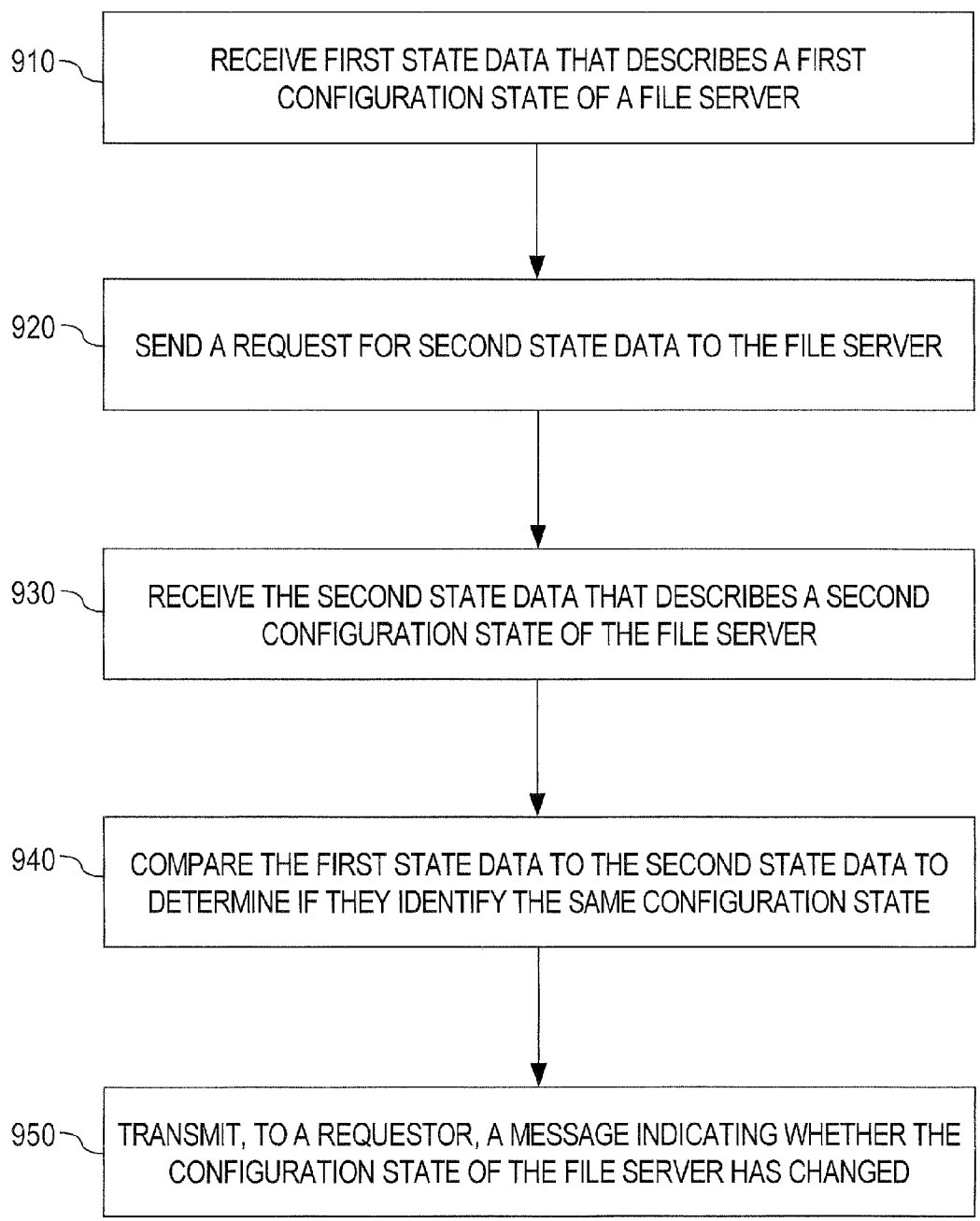
FIG. 9 is a flowchart illustrating the functional steps of determining whether a configuration state of a file server has changed.

Verifying the Configuration State of a File Server in the Scanner/File Server Context FIG. 9 is a flowchart illustrating the functional steps of determining whether a configuration state of a file server has changed. For ease of explanation, the functional steps of FIG. 9 shall be explained below with reference to FIG. 8A. However, in other embodiments of the invention, the functions performed by security server 830 may be performed instead by a security module residing on, or operationally connected to, a pluggable device, a scanner, or a file server.

In step 910, first state data that describes a first configuration state of a file server is received. A user, such as an administrator, may wish to register a file server with security server 830. The act of registering a particular file server with security server 830 involves retrieving first state data from the particular file server, and storing the first state data with security server 830. For purposes of providing a clear example, the steps of FIG. 9 shall be explained below with reference to receiving first state data in step 910 that describes a first configuration state of file server 820 of FIG. 8A.

An administrator may use a client, or an interface provided by any of scanner 810, file server 820, or security server 830, to send a request, to register file server 820, to security server 830. In response to security server 830 receiving the request, security server 830 sends a request for the first state data to file server 820. After file server 820 receives the request from security server 830 for the first state data, file server 820 prepares the first state data and transmits the first state data to security server 830.

The first state data may describe any configuration state of file server 820. For example, the first state data may describe a security state of file server 820. In other words, the first state data may identify the manner in which the security settings of file server 820 are configured at the time when file server 820 is registered with security server 830.

In an embodiment, file server 820 may create the first state data using a hash function and/or a seed to obtain a hash value to use as the first state data. Such an approach may be advantageous, as it provides a level of encryption for the first state data, since the current configuration of file server 820 cannot be inferred from inspecting the hash value. In such an embodiment, the first state data may be generated by file server 820 (a) determining a set of configuration information that describes the configuration state of file server 820, (b) hashing the configuration information using a hash function and/or a seed to obtain a hash value, and (c) using the hash value as the first state data. The hash function and/or the seed may be provided to document-processing device in the request for the first state data sent from security server 830, in a separate message from security server 830, or an administrator may provide the hash function and/or the seed to file server 820. If security server 830 does not provide file server 820 with the hash function and/or seed, then the hash function and/or seed used to encrypt the first state data may also be stored at security server 830.

Instead of or in addition to encrypting the first state data using a hash function, file server 820 may encrypt the first state data using other approaches as well. For example, the first state data may be encrypted by file server 820 using a public key associated with security server 830, and thereafter the first state data may be decrypted by security server 830 using a private key associated with security server 830. After security server 830 receives the first state data, processing proceeds to step 920.

In step 920, a request for second state data is sent by security server 830 to file server 820. The request of step 920 may be performed in response to a user, using an interface provided by either a client operationally connected to scanner 810 or scanner 810, sending to security server 830, a request to verify that the configuration state of file server 820 has not changed since file server 820 was registered with security server 830. The request to verify that the configuration state of file server 820 may be sent automatically after the occurrence of an event (such as when scanner 810 is powered on) or upon request of a user. Such a request may be advantageous to ensure that a particular file server, to which scanner 810 wishes to send a request to store an electronic document, is secure. In this way, if the configuration state of a particular file server has changed since it was registered with security server 830, then scanner 810, or a user of scanner 810, may determine that it may be too risky to issue a request to store an electronic document to that file server since its configuration state has changed since it was registered; consequently, another file server may be selected, either by scanner 810 or by the user of scanner 810, to service a request to store the electronic document.

Second state data is data that describes a second configuration state of file server 820. The second configuration state described by the second state data corresponds to the current configuration state of file server 820 at the time of receiving the request of step 920.

In an embodiment, the request for second state data that is sent by security server 830 in step 920 is encrypted. For example, security server 830 may encrypt the request of step 920 using a public key associated with file server 820, and upon receiving the request of step 920, file server 820 can decrypt the request using a private key associated with file server 820. After the request for the second state data is sent from the security server 830 to file server 820, processing proceeds to step 930.

In step 930, the second state data is received from file server 820 by security server 930. In an embodiment, the second state data may be encrypted by file server 820 using the same techniques discussed above with reference to encrypting the first state data, e.g., the second state data may be encrypted using (a) a hash function and/or a seed and/or (b) a public key associated with security server. Thereafter, processing proceeds to step 940.

In step 940, the first state data received in step 910 and the second state data received in step 930 are compared by security server 830 to determine if the first state data and the second state data identify the same configuration state. If the first state data and the second state data identify the same configuration state, then the configuration state of document-processing device 820 has not changed since file server 820 was registered. However, if the first state data and the second state data do not identify the same configuration state, then the configuration state of file server 820 has changed since file server 820 was registered. If the configuration of file server 820 has changed since it was registered with security server 830, then the possibility exits that the change in configuration may result in file server 820 being less secure.

If the configuration of file server 820 has not changed since it was registered with security server 830, the first state data and the second state data are identical. For example, if the first state data and the second state data were created using a hash function and/or a seed, then the hash value for each of the first state data and the second state data should be the same, since the configuration information used to create the hash value in each case is the same. However, if the configuration information changed since file server 820 was registered with security server 830, then the hash value of the second state data should be different than the hash value of the first state data, since the input to the hash function used to create the hash value in each case is different. After the first state data and the second state data are compared, processing proceeds to step 950.

In step 950, a message, indicating whether the configuration state of the file server 820 has changed, is transmitted by security server 830 to the requestor of the verification of the security state of file server 820. For example, the message may be sent to scanner 810. In an embodiment, upon scanner 810 receiving the message, scanner 810 may present the message to a user to allow the user to take some action, e.g., the user may subsequently instruct scanner 810 to issue a request to store an electronic document to file server 820 anyway or may instruct scanner 810 to issue a request to store an electronic document to a different file server than file server 820.

In another embodiment, scanner 810 may be configured to interpret the message of step 950 to perform an action without presenting the message to the user. For example, in an embodiment, if scanner 810 reads the message of step 950, and the message indicates that the configuration state of file server 820 has changed, then scanner 810 may not allow the user of scanner 810 to issue a request to store an electronic document to file server 820 and/or present a recommendation to the user of scanner 810 that the user of scanner 810 issue a request to store an electronic document to another file server other than file server 820.

Advantageously, an entity, such as a scanner, may verify whether the configuration state of a file server has been changed since the file server has been registered with a security server. In this way, one can determine whether a potential security risk exists due to a change in the configuration state of a file server. Thus, if a scanner determines that the configuration state of a file server has changed since the file server was registered, then the scanner may perform one or more actions, as described above.

Figure 10:
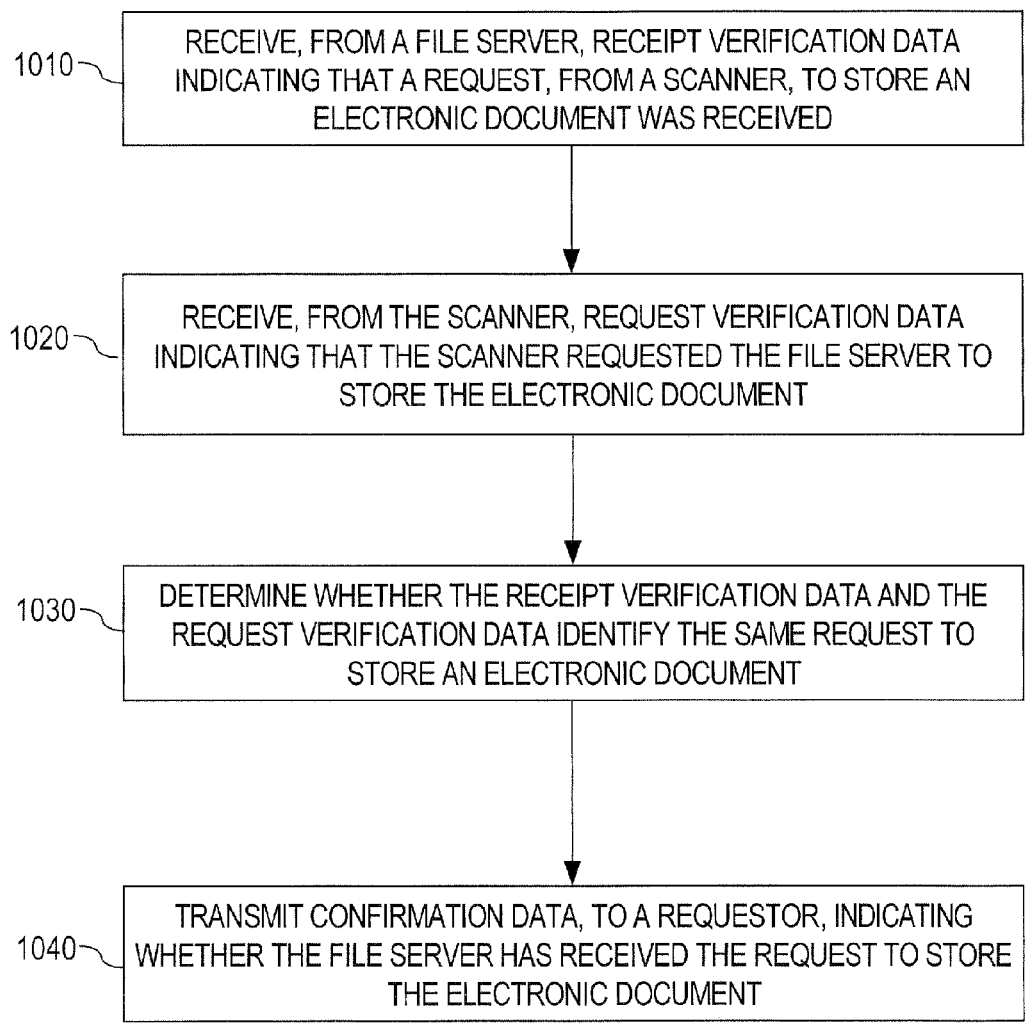
FIG. 10 is a flowchart illustrating the functional steps of verifying that a file server has received a request, to store an electronic document, from a particular scanner according to an embodiment of the invention.

Verifying that a File Server has Received a Request to Store an Electronic Document in the Scanner/File Server Context According to another approach for processing electronic documents in a secure manner, the receipt of a request, from a particular scanner, to a particular file server, to store a particular electronic document may be verified. FIG. 10 is a flowchart illustrating the functional steps of verifying that a particular file server has received a request, to store a particular electronic document, from a particular scanner according to an embodiment of the invention. For ease of explanation, the functional steps of FIG. 10 shall be explained below with reference to FIG. 8A. For purposes of providing a clear example, the steps of FIG. 10 shall be explained with reference to verifying that file server 820 received a request, to store document ABC, from scanner 810.

In step 1010, receipt verification data is received from file server 820 by security server 830. Each time file server 820 receives a request to store an electronic document, file server 820 may send receipt verification data to security server 830. The receipt verification data is data that indicates that a request, from a particular requestor (such as scanner 810), to store a particular electronic document at a particular file server, was received by the particular file server. Thus, in this example, the receipt verification data received in step 1010 indicates that a request, from scanner 810, to store document ABC, was received by file server 820. In some embodiments, receipt verification data may also contain other information about the request received by file server 820, e.g., the receipt verification data may also include a timestamp of when the request was received.

In an embodiment, file server 820 may generate the receipt verification data to include information that identifies (a) file server 820, (b) the requestor (such as scanner 810), and (c) document ABC. Information contained in the receipt verification data that identifies document ABC may be generated by file server 820 by applying a hash function to document ABC to generate a hash value.

In an embodiment, file server 820 may encrypt the receipt verification data using any mechanism for encrypting data that security server 830 can decrypt. For example, file server 820 may encrypt receipt verification data using a pubic key associated with security server 830, and security server 830 may decrypt receipt verification data using the corresponding private key associated with security server 830.

In an embodiment, the receipt verification data may include an encrypted copy of document ABC. As explained in further detail below, the encrypted copy of document ABC may be subsequently used by security server 830 in verifying that file server 820 received the request from scanner 810 to store document ABC and in verifying the contents of document ABC.

In an embodiment, file server 820 may send the receipt verification data to security server 830 in response to receiving the request to store document ABC from scanner 810. In another embodiment, file server 820 may delay sending the receipt verification data to security server 830 for a configurable period of time or until a configurable number of requests to store documents have been received by file server 820 so that receipt verification data for multiple requests may be sent from file server 820 to security server 830 in a batch process or in single communication. After the receipt verification data is received from file server 820, processing proceeds to step 1020.

In step 1020, request verification data is received from scanner 810 by security server 830. Request verification data is data that indicates that a particular scanner has issued a request to store a particular electronic document to a particular file server. Thus, in this example, the request verification data received in step 1020 indicates that scanner 810 has issued a request to store document ABC to file server 820. Scanner 810 may transmit the request verification data to security server 830 in response to issuing the request to store a document identified by the request verification data. In other words, each time a scanner issues a request to store a document to a file server, the scanner may also send request verification data to security server 830. In some embodiments, request verification data may also contain other information about a request, to store a document, issued by a scanner, e.g., the request verification data may also include a timestamp of when the request was issued.

In an embodiment, scanner 810 may generate the request verification data to include information that identifies (a) file server 820, (b) scanner 810, and (c) document ABC. Information contained in the request verification data that identifies document ABC may be generated by scanner 810 by applying a hash function to document ABC to generate a hash value. In such an approach, the hash function used by client 110 is the same hash function used by file server 820. As a result, the hash value computed by scanner 810 to identify document ABC should be the same as the hash value computed by file server 820 to identify document ABC.

Scanner 810 may encrypt request verification data using any mechanism for encrypting data that security server 830 can decrypt. For example, scanner 810 may encrypt request verification data using a public key associated with security server 830, and security server 830 may decrypt request verification data using a corresponding private key associated with security server 180. After security server 830 receives the request verification data, processing proceeds to step 1030.

In step 1030, security server 830 determines whether the receipt verification data and the request verification data identify the same request to store an electronic document. Security server 830 may make this determination by inspecting the receipt verification data and the request verification data, although it may be necessary to decrypt the receipt verification data and the request verification data prior to inspection.

Embodiments may perform the comparison of step 1030 in a variety of different approaches. According to one approach, all sets of receipt verification data and all sets of request verification data received by security stored are stored for a configurable amount of time by security server 830. Security server 830 may, upon receiving receipt verification data, determine if a set of request verification data that identifies the same request as the receipt verification data has been received. Similarly, security server 830 may, upon receiving request verification data, determine if a set of receipt verification data that identifies the same request as the request verification data has been received. In another approach, upon receiving either the receipt verification data or the request verification data, security server 830 may wait a configurable period of time before determining if a corresponding set of receipt verification data or request verification data has been received to allow enough time for the corresponding set of receipt verification data or request verification data to be received by security server 830.

In an embodiment wherein receipt verification data and request verification data is stored by security server 830 for a configurable period of time, a scanner may issue, to security server 830, a request to verify that a file server received a request to store an electronic document some time after the scanner issued the request to the file server. The scanner may issue a request ("a verification request") to verify whether the file server received the request. The verification request from the scanner includes information to identify the particular request being verified, e.g., the request may include the request verification data. Security server 830 may then determine if any stored receipt verification data identifies the same request to process an electronic document as the request to process an electronic document identified by the verification request.

In an embodiment, if file server 820 sent an encrypted copy of document ABC to security server 830 as part of the receipt verification data, then security server 830 may perform a three-way comparison between the receipt verification data, the request verification data, and server verification data. Server verification data is data that is generated by security server 830 from the copy of the document received from file server 820. For example, if the receipt verification data and the request verification data each contain a hash value identifying document ABC, then security server 830 may apply the hash function to document ABC to generate its own hash value. Security server 830 may then compare the hash value contained in the receipt verification data, the hash value contained in the request verification data, and the hash value generated by security server 830 to ensure that each identifies the same document. After the comparison of step 1030 is performed, processing proceeds to step 1040.

In step 1040, confirmation data, that indicates whether file server 820 received a request, from scanner 810, to store document ABC, is sent from security server 830 to scanner 810. Advantageously, security server 830 may verify, either upon request or automatically after security server 830 receives either request verification data or receipt verification data, to scanner 810 that a particular file server received the request to store a document from scanner 810.

Additionally, if file server 820 sent an encrypted copy of document ABC to security server 830 as part of the receipt verification data, security server 830 may store the electronic document for a configurable period of time. In this way, security server 830 may provide a copy of the electronic document to a requestor in response to receiving a request for the electronic document and/or in response to a verification request.

In an embodiment, in addition to verifying that a particular file server received a particular request to store an electronic document from a particular party, information stored at security server 830 may be used in servicing requests to obtain other information about requests to store the document, such as when a particular file server received a particular request to store a particular electronic document from a particular scanner. Having described an approach for verifying whether a file server received a particular request to store an electronic document, techniques will now be discussed for verifying whether a scanner issued a particular request to store an electronic document.

Figure 11:
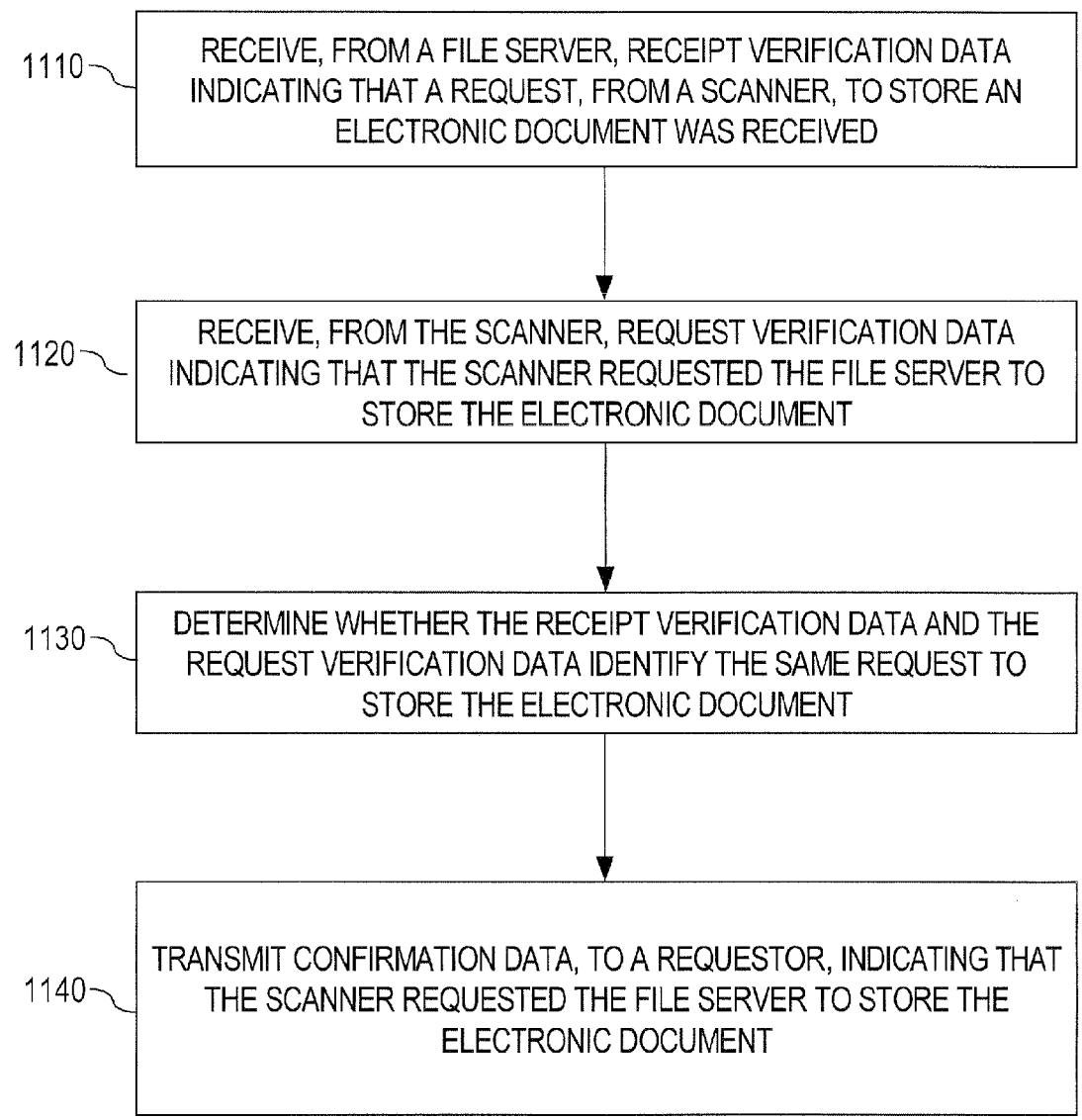
FIG. 11 is a flowchart illustrating the functional steps of verifying that a particular scanner sent a request to store an electronic document to a document-processing device according to an embodiment of the invention.

Verifying that a Scanner Issued a Request to Store an Electronic Document to a File Server in the Scanner/File Server Context According to another approach for processing electronic documents in a secure manner, the issuance of a request to store a particular electronic document, by a particular scanner, to a particular file server, may be verified. FIG. 11 is a flowchart illustrating the functional steps of verifying that a scanner requested an electronic document to be stored by a particular file server according to an embodiment of the invention. For ease of explanation, the functional steps of FIG. 11 shall be explained below with reference to FIG. 8A. For purposes of providing a clear example, the steps of FIG. 11 shall be explained with reference to verifying that scanner 810 issues a request to store document ABC to file server 820.

Steps 1110, 1120, and 1130 of FIG. 11 are similar to those discussed above with respect to steps 1010, 1020, and 1030 of FIG. 10 respectively. After the performance of step 1130, processing proceeds to step 1140.

In step 1140, confirmation data, that indicates scanner 810 requested file server 820 to store document ABC, is sent from security server 830 to another entity, such as a client (not pictured in FIG. 8A) or file server 820. In this way, the other entity may verify that scanner 810 issued the request to store document ABC that was received by file server 820. File server 820 may store received confirmation data for a configurable period of time. In this way, file server 820 may prove the identity of scanner 810 that sent requests to file server 820. For example, file server 820 may provide a mechanism to a user, such as an administrator, to enable the user to access information about which scanners issued requests to file server 820 and information about those requests.

Additionally, a client (not pictured in FIG. 8A) may issue a request to security server 830 to verify that scanner 810 issued a particular request to file server 820. In this way, clients may issue requests to security server 830 to verify that a scanner issued a particular request to store an electronic document to a particular file server. Such requests may need to be authenticated or be associated with a certain level of permission before the request is processed by security server 830.

In an embodiment, in addition to verifying that a particular scanner issued a particular request to a particular file server, information stored at security server 830 may be used to service a request to determine additional information, such as when a particular scanner issued a particular request, to store a document, to a particular file server.

Having described an approach for verifying whether a particular scanner issued a particular request to store an electronic document, techniques will now be discussed for protecting the storage device of a file server according to an embodiment.

Figure 12:
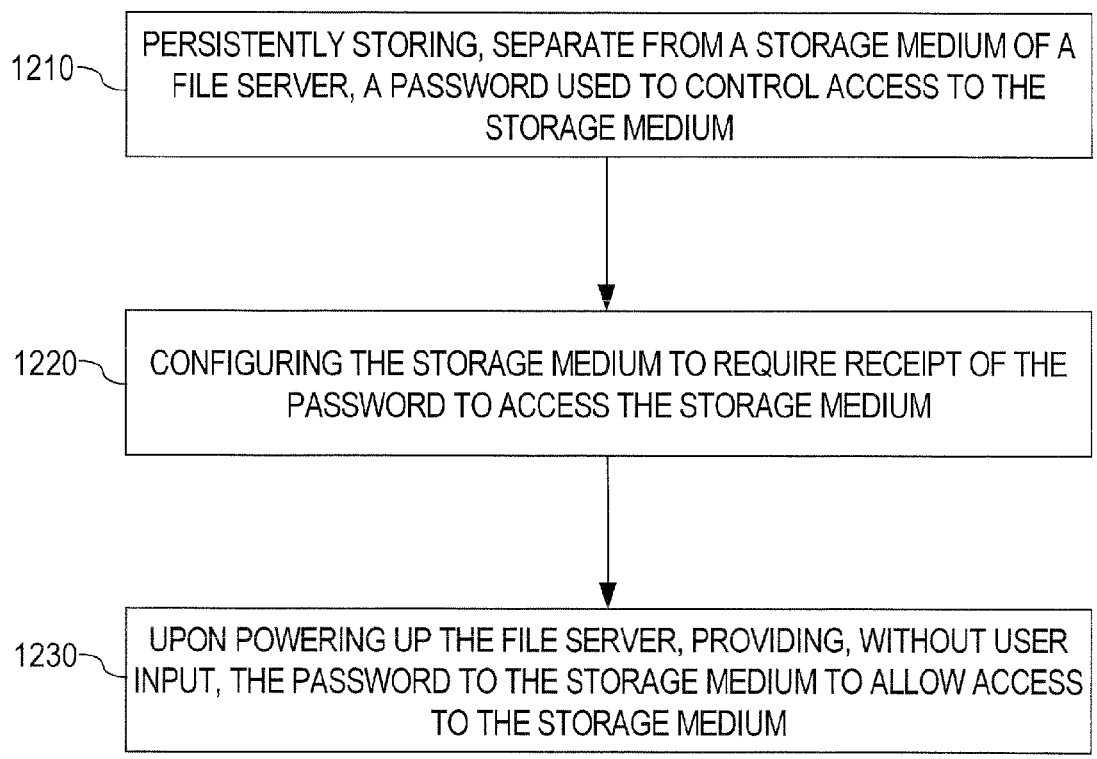
FIG. 12 is a flowchart illustrating the functional steps of protecting a storage medium of a file server according to an embodiment of the invention.

Protecting a Storage Device of a File Server in the Scanner/File Server Context According to another approach for processing electronic documents in a secure manner, a storage medium of a file server may be protected against unauthorized access. FIG. 12 is a flowchart illustrating the functional steps of protecting a storage medium of a file server according to an embodiment of the invention. For ease of explanation, the steps of FIG. 12 shall be explained below with reference to FIG. 13, which is a block diagram of an illustrative file server 1310 according to an embodiment of the invention.

File server 1310 comprises protected storage medium 1320 and password storage medium 1330. Protected storage medium 1320 represents a persistent storage of document-file server 1310 that may be used to store sensitive information, such as information about the electronic documents that are stored on file server 1310. A non-limiting, illustrative example of protected storage medium 1320 includes a hard drive.

Password storage medium 1330 represents a persistent storage of file server 1310 that may be used to store password 1332. Although any mechanism for persistently storing data may be used to implement password storage medium 1330, the capacity of password storage medium 1330 need only be a large as to accommodate the persistent storage of password 1332. A non-limiting, illustrative example of password storage medium 1330 is flash memory. Password storage medium 1330 may also be embodied as the storage medium storing the BIOS of document-processing device 1310, as password 1332 may also be stored by the BIOS of document-processing device 1310.

Password 1332 may be implemented using any data that may be used to control access to protected storage medium 1320.

In step 1210 of FIG. 12, password 632 is persistently stored separate from the storage medium. For example, password 632 may be stored in password storage medium 630.

In step 1220, protected storage medium 1320 is configured to require receipt of password 1332 to access protected storage medium 1320. As a result of configuring protected storage medium 1320 to require receipt of password 1332 to access protected storage medium 1320, an entity cannot access protected storage medium 1320 without providing password 1332 to protected storage medium.

In an embodiment, protected storage medium 320 may be embodied using an Advanced Technology Attachment (ATA) hard drive. An ATA hard drive has a hard drive controller that is located on the ATA hard drive. The drive controller of an ATA hard drive may be configured to require receipt of a password in order to access the ATA hard drive. Thus, an ATA hard drive controller may be instructed in step 1220 to require receipt of password 1332 to allow access to protected storage medium 1320.

In an embodiment, file server 1310 may automatically configure protected storage medium 1320 to require receipt of password 1332 to access protected storage medium 1320 in response to file server 1310 receiving a request to power down. In this way, protected storage medium 1320 is "locked," in that if protected storage medium 1320 is removed from file server 1310 prior to file server 1310 powering on, password 1332 must be provided to protected storage medium 1320 to access protected storage medium 1320.

In step 1230, upon powering up file server 1310, file server 1310 provides password 1332 to protected storage medium 1320 without user input, thereby "unlocking" protected storage medium 1320. As file server 1310 provides password 1332 to protected storage medium 1320 upon powering up, file server 1310 may access protected storage medium 1320.

Embodiments of the invention may advantageously be used to "lock" protected storage medium 1320 when file server 1310 is powered down, thereby preventing unauthorized access to protected storage medium 1320. As protected storage medium 1320 is locked and unlocked without requiring any input or intervention from a user, the protection of protected storage medium 1320 is transparent to a user of file server 1310. If sensitive information is stored on protected storage medium 1320, and if protected storage medium 1320 is removed when file server 1310 is powered down, then protected storage medium 1320 cannot be accessed unless password 1332 is provided, thereby providing security that the sensitive information stored on protected storage medium 1320 cannot be accessed by unauthorized personnel.

In an embodiment, the password used to control access to protected storage medium 1320 may be changed each time file server 1310 is powered on. In such an embodiment, upon powering up file server 1310, a new password used to control access to protected storage medium 1320 is generated. Thereafter, protected storage medium 1320 is configured to (a) require receipt of the new password to allow access the protected storage medium 1320, and (b) no longer require receipt of the previous password to allow access the protected storage medium 1320.

In an embodiment, a master password may be used. A master password is a password which protected storage medium 1320 will accept to provide access to protected storage medium 1320. The drive controller of protected storage medium 1320 may be configured to allow access to protected storage medium 1320 if the master password is provided. In this way, if an administrator of file server 1310 needs to access protected storage medium 1320, the administrator may access protected storage medium 1320 with the master password. Such an embodiment is advantageous, as password 1332 may be changed each time file server 1310 is powered on as explained above. In this way, if file server 1310 fails or a problem occurs in which file server 1310 is unable to retrieve password 1332 from password storage medium 1330, the administrator may use the master password to access protected storage medium 1320. Thus, even though password 1332 may not be retrievable from protected storage medium 1320, the administrator may still gain access to protected storage medium 1320 using the master password.

In an embodiment, an administrator may configure the operation of protected storage medium 1320 by supplying the master password to the drive controller of protected storage medium 1320. One manner in which the administrator may configure protected storage medium 1320 is to (a) not permit data from being read from protected storage medium 1320 by any entity other than file server 1310, but (b) allow data stored on protected storage medium 1320 to be deleted. Such a configuration may be used when there is no need to recover the data stored on protected storage medium 1320. For example, many file servers only store documents temporarily for a variety of reasons, and do not allow subsequent retrieval of temporarily stored documents by other devices.

Inquiring about a User's Job Status in the Scanner/File Server Context

In an embodiment, a user may send a message to a file server to obtain information about a job status. A user's job status, as used herein, generally refers to information about a request to process an electronic document that the user submitted to a file server. For example, as previously explained, a file server may provide email functionality. As such, the user may send a request to the file server to enquiry whether a particular electronic document has been received or sent via email by the file server.

A user's job status may include information about requests that are currently being processed by a file server and may include information about requests that have already been processed by a file server. In this way, a user may retrieve information about requests to process electronic documents that the user previously sent to a file server. In an embodiment, a user who is not an administrator may only inquiry about his own job status.

To illustrate the operation an embodiment of the invention, initially a user may user scanner 810 to send a status inquiry message to file server 820. The status inquiry message contains identification information for the user that uniquely identifies the user, e.g., the identification information may include the user's username or other unique identifier. Additionally, the status inquiry message may identify those requests that the user is interested in receiving status information. For example, the status inquiry message may identify that the user wishes to receive status information only for pending requests or for requests that the user sent within a bounded period of time.

Upon receiving the status inquiry message, file server 820 retrieves status information for the user in accordance with the status inquiry message. In an embodiment, file server 820 uses the identification information contained in the status inquiry message to retrieve records containing the requested status information, which may be stored at file server 820 or at security server 830. After retrieving the records containing the requested status information, file server 820 sends the records containing the requested status information to scanner 810. Scanner 810 may then display the records containing the requested status information to the user.

In an embodiment, the records containing the status information may be stored (either at file server 820 or at security server 830) in an encrypted manner, e.g., the records may be encrypted using the user's public key, and the user may decrypt the records using their private key. In an alternate embodiment, prior to returning the records to the user, file server 820 may encrypt the records containing the requested status information. Other mechanisms for encrypting the records may be employed by other embodiments of the invention.

In an embodiment, an administrator may inquiry about the job status of any user. For example, an administrator may send a status inquiry message to a file server that requests the status of any number of users, including two or more users. Thus, an administrator may inquiry about the job status of another user besides the administrator. In such an embodiment, the status inquiry message sent by the administrator would contain identification information that uniquely identifies one or more users. In response to receiving the status inquiry message from an administrator, a file server retrieves status information for each user identified in the status inquiry message, and thereafter sends the status information to the client from which the administrator sent the status inquiry message.

In an embodiment, prior to an administrator sending a status inquiry message that inquires about the status or another user, an administrator may need to be authenticated at the client. Alternately, prior to a file server processing a status inquiry message, from an administrator, which inquires about the status or another user, the administrator may need to be authenticated at the document-processing device.

Verifying the Capabilities of a File Server in the Scanner/File Server Context

In an embodiment, a scanner may verify that a particular file server supports a particular feature. For example, a user may only wish to issue to a request to store an electronic document to a file server that supports a desired security feature. Thus, an embodiment of the invention may be employed to confirm that a document-processing device supports the desired security feature prior to issuing a request to print the electronic document to the document-processing device.

To illustrate how an embodiment of the invention works in further detail, prior to client 110 sending a request to process an electronic document to document-processing device 120, client 110 sends a capability request message to document-processing device 120. Upon receiving the capability request message, document-processing device 120 sends capability information to client 110. The capability information describes the current capabilities of document-processing device 120 with respect to processing documents. For example, the capability information may describe the current security features of which document-processing device 120 is configured to provide.

Upon client 110 receiving the capability information from document-processing device 120, client 110 determines if the current capabilities of document-processing device 120 satisfy the desired requirements for a request to process an electronic document. If the current capabilities of document-processing device 120 do satisfy the desired requirements for a request to process an electronic document, then client 110 notifies the user that the desired capabilities were obtained, and sends the request to process the electronic document to document-processing device 120.

However, if the current capabilities of document-processing device 120 do not satisfy the desired requirements for a request to process an electronic document, then client 110 sends a change request, to document-processing device 120, to change the current capabilities of document-processing device 120 so that the capabilities satisfy the desired requirements for a request to process an electronic document. For example, the change request may specify that the security settings of document-processing device 120 be updated so that document-processing device 120 is configured to support a specified security feature. In response, document-processing device 120 will send, to client, a message indicating whether the current capabilities of document-processing device 120 may be updated in the manner requested by client 110 in the change request.

If the current capabilities of document-processing device 120 may be updated in the manner requested by client 110 in the change request, then client 110 reports to the user that the desired capabilities were obtained, and sends a message to document-processing device instructing document-processing device 120 to update its current capabilities in the manner requested by client 110 in the change request. In addition, thereafter client 110 sends the request to process the electronic document to document-processing device 120.

On the other hand, if the current capabilities of document-processing device 120 may not be updated in the manner requested by client 110 in the change request, then client 110 reports to the user that the desired capability were not obtained, and client 110 may await further instruction from the user. For example, the user may specify another document-processing device 120 to which a request to process an electronic document is to be sent, or may update the set of desired capabilities which are needed to process the electronic document. In this way, client 110 may be assured that the electronic document is processed by a document-processing device with the desired capability.

System Overview of the Fax/Fax Context

In the fax/fax context, a user may use a facsimile machine to communicate with another facsimile machine. According to one approach for processing electronic documents in a secure manner, a user may verify that the configuration state of a facsimile machine has not changed since the facsimile machine was registered with a security server. Embodiments of the invention may implement the functions performed by the security server differently, as explained in further detail below.

FIG. 14A is a block diagram illustrating of an illustrative system 1400 according to an embodiment of the invention. System 1400 of FIG. 14A comprises facsimile machines 1410 and 1420, security server 1430, and communications links 1440 and 1442.

A facsimile machine, such as facsimile machine 1410 and 1420, as used herein, represents any device that is capable of sending or receiving a facsimile request. A facsimile request is a request for the receiving facsimile machine to process an electronic document to produce a printed version of the electronic document. For ease of explanation, as examples shall be presented herein where facsimile machine 1410 sends a facsimile request to facsimile machine 1420, facsimile machine 1410 shall be referred to as sending facsimile machine 1410 and facsimile machine 1420 shall be referred to as receiving facsimile machine 1420. While only two facsimile machines are depicted in FIG. 14A for ease of explanation, system 100 may include any number of facsimile machines.

Security server 1430 represents a device that is (a) capable of communicating with a facsimile machine over communications link 1430. Security server 130 is configured to perform security functionality. For example, security server 1430 may respond to requests sent from sending facsimile machine 1410 to determine if the configuration state of receiving facsimile machine 1420 has changed since receiving facsimile machine 1420 was registered with security server 1430. Security server 1430 may also be used in verifying that certain actions performed in system 1400 took place, such as sending facsimile machine 1410 sending a facsimile request to receiving facsimile machine 1420. The actions performed by security server 1430 shall be described in further detail below.

Communications link 1440 may be implemented by any medium or mechanism that provides for the exchange of data between facsimile machines. Communications link 1442 may be implemented by any medium or mechanism that provides for the exchange of data between a facsimile machine and security server 1430. Non-limiting, illustrative examples of communications links 1440 and 1442 include a network such as a Local Area Network (LAN), Wide Area Network (WAN), Ethernet or the Internet, or one or more terrestrial, satellite or wireless links.

In some embodiments of the invention, the functions performed by security server 1430 may be implemented on a device that is physically connected to a facsimile machine. FIG. 14B is a block diagram illustrating of an illustrative system 1460 according to such an embodiment of the invention. As shown in FIG. 14B, security module 1468 is implemented on a pluggable device 1466 that is physically connected (or "plugged in") to receiving facsimile machine 1464 over communications link 1470. Security module 1468 corresponds to a functional component, such as a set of executable software instructions, on pluggable device 1466 that performs the functions described herein as being performed by security server 1430. While FIG. 14B depicts pluggable device 1466 physically connected to a single facsimile machine, in other embodiments of the invention, pluggable device 1466 may be physically connected to two or more document-processing devices or may be connected to sending facsimile machine 1462.

Figure 14C:
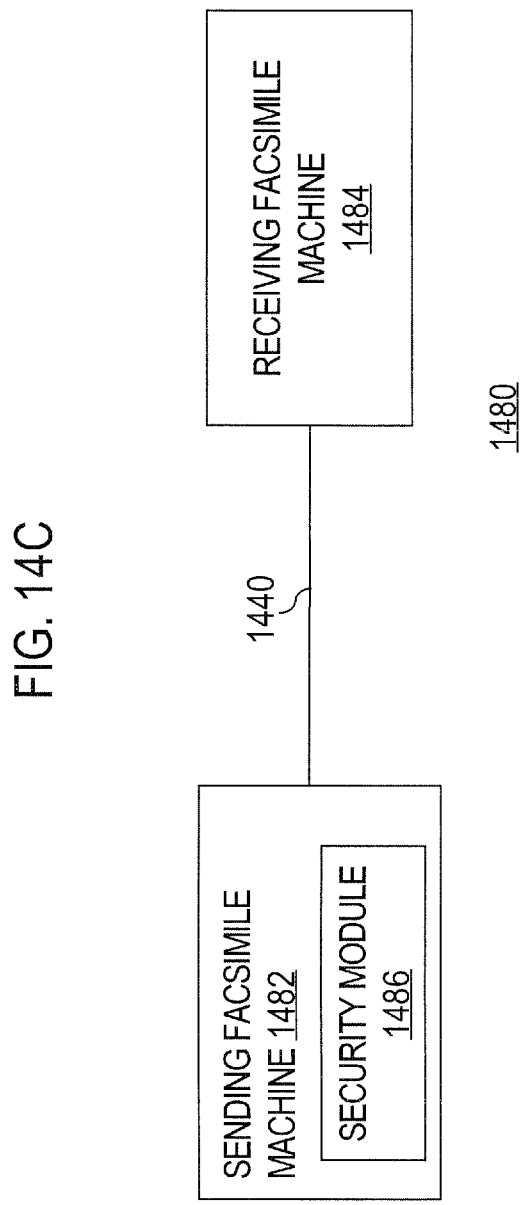
FIG. 14C is a block diagram illustrating of an illustrative system according to a third embodiment of the invention.

In other embodiments of the invention, the functions performed by security server 1430 may be implemented on a facsimile machine. FIG. 14C is a block diagram illustrating of an illustrative system 1480 according to such an embodiment of the invention. As shown in FIG. 14C, security module 1486 resides on sending facsimile machine 1482. Security module 1486 corresponds to a functional component, such as a set of executable software instructions, on sending facsimile machine 1482 that is configured to perform the functions described herein as being performed by security server 1430. In other embodiments of the invention (not depicted), security module 1486 may be implemented on receiving facsimile machine 1484.

Having described several illustrative systems, the process of verifying the configuration state of a facsimile machine according to an embodiment shall now be described.

Figure 15:
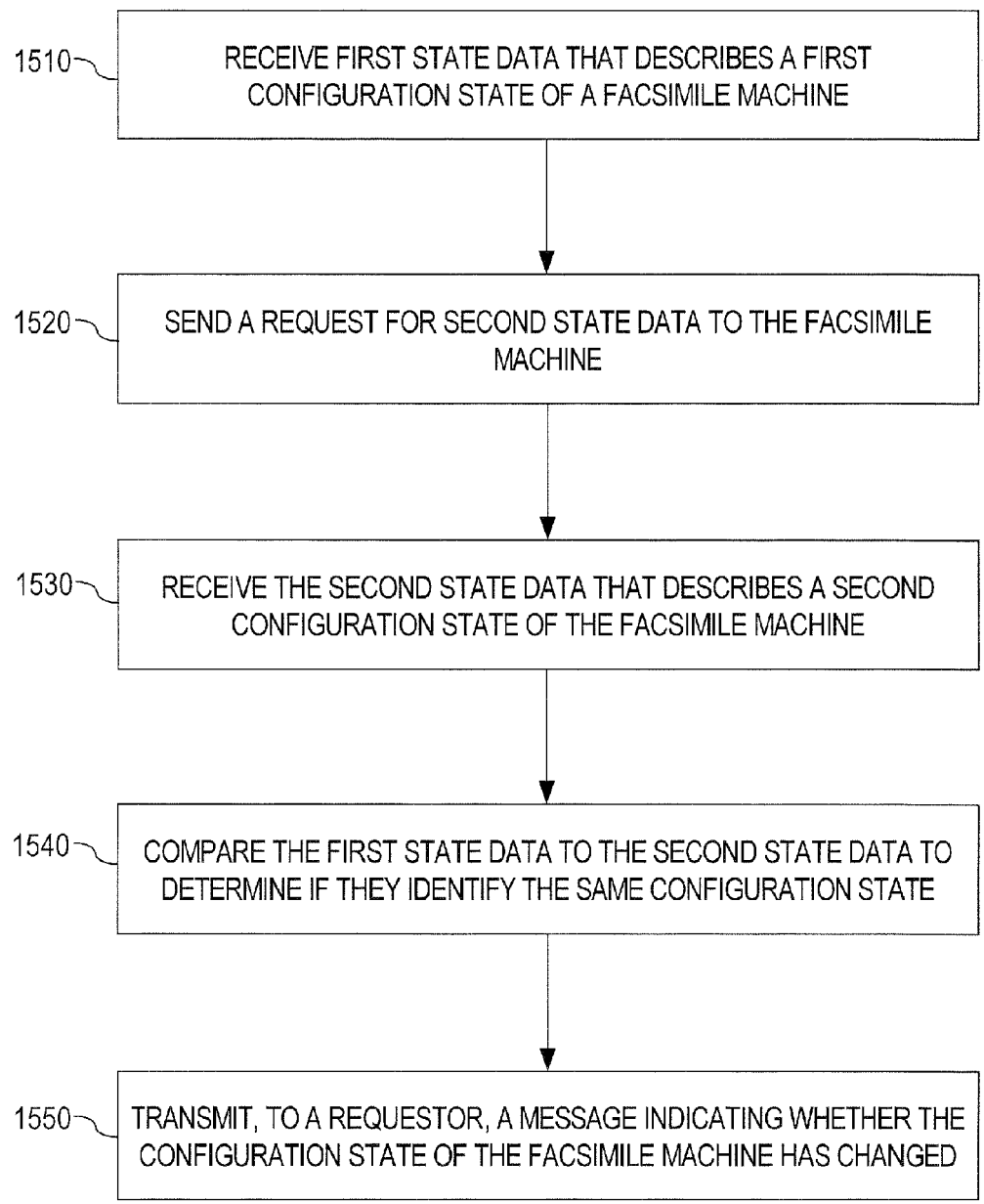
FIG. 15 is a flowchart illustrating the functional steps of determining whether a configuration state of a facsimile machine has changed.

Verifying the Configuration State of a Facsimile Machine in the Fax/Fax Context FIG. 15 is a flowchart illustrating the functional steps of determining whether a configuration state of a facsimile machine has changed. For ease of explanation, the functional steps of FIG. 15 shall be explained below with reference to FIG. 14A. However, in other embodiments of the invention, the functions performed by security server 1430 may be performed instead by a security module residing on a pluggable device or a facsimile machine.

In step 1510, first state data that describes a first configuration state of a facsimile machine is received. A user, such as an administrator, may wish to register a particular facsimile machine with security server 1430. The act of registering a particular facsimile machine with security server 1430 involves retrieving first state data from the particular facsimile machine, and storing the first state data with security server 1430. For purposes of providing a clear example, the steps of FIG. 15 shall be explained below with reference to receiving first state data in step 1510 that describes a first configuration state of receiving facsimile machine 1420.

An administrator may use client to send a request, to receiving facsimile machine 1420, to security server 1430. In response to security server 1430 receiving the request, security server 1430 sends a request for the first state data to receiving facsimile machine 1420. Alternately, a user may use an interface provided by receiving facsimile machine 1420 to send the request for the first state data to receiving facsimile machine 1420. After receiving facsimile machine 1420 receives the request for the first state data, receiving facsimile machine 1420 prepares the first state data and transmits the first state data to security server 1430.

The first state data may describe any configuration state of receiving facsimile machine 1420. For example, the first state data may describe a security state of receiving facsimile machine 1420. In other words, the first state data may identify the manner in which the security settings of receiving facsimile machine 1420 are configured at the time when receiving facsimile machine 1420 is registered with security server 1430.

In an embodiment, receiving facsimile machine 1420 may create the first state data using a hash function and/or a seed to obtain a hash value to use as the first state data. Such an approach may be advantageous, as it provides a level of encryption for the first state data, since the current configuration of receiving facsimile machine 1420 cannot be inferred from inspecting the hash value. In such an embodiment, the first state data may be generated by receiving facsimile machine 1420 (a) determining a set of configuration information that describes the configuration state of receiving facsimile machine 1420, (b) hashing the configuration information using a hash function and/or a seed to obtain a hash value, and (c) using the hash value as the first state data. The hash function and/or the seed may be provided to receiving facsimile machine 1420 in the request for the first state data sent from security server 1430, in a separate message from security server 1430, or an administrator may provide the hash function and/or the seed to receiving facsimile machine 1420. If security server 1430 does not provide receiving facsimile machine 1420 with the hash function and/or seed, then the hash function and/or seed used to encrypt the first state data may also be stored at security server 1430.

Instead of or in addition to encrypting the first state data using a hash function, receiving facsimile machine 1420 may encrypt the first state data using other approaches as well. For example, the first state data may be encrypted by receiving facsimile machine 1420 using a public key associated with security server 1430, and thereafter the first state data may be decrypted by security server 1430 using a private key associated with security server 1430. After security server 1430 receives the first state data, processing proceeds to step 1520.

In step 1520, a request for second state data is sent by security server 1430 to receiving facsimile machine 1420. The request of step 1520 may be performed in response to sending facsimile machine 1410 sending, to security server 1430, a request to verify that the configuration state of receiving facsimile machine 1420 has not changed since receiving facsimile machine 1420 was registered with security server 1430. The request to verify that the configuration state of receiving facsimile machine 1420 may be sent automatically by sending facsimile machine 1410 after the occurrence of an event (such as when sending facsimile machine 1410 is powered on or just prior to sending a facsimile request to receiving facsimile machine 1420) or upon request of a user of sending facsimile machine 1410. Such a request may be advantageous to ensure that a facsimile machine, to which sending facsimile machine 1410 wishes to send a facsimile request, is secure. In this way, if the configuration state of a particular facsimile machine has changed since it was registered with security server 1430, then sending facsimile machine 1410, or a user of sending facsimile machine 1410, may determine that it may be too risky to send a facsimile request to that particular facsimile machine since its configuration state has changed since it was registered; consequently, another facsimile machine may be selected, either by sending facsimile machine 1410 or the user of sending facsimile machine 1410, to receive the facsimile request that sending facsimile machine 1410 wishes to send.

Second state data is data that describes a second configuration state of receiving facsimile machine 1420. The second configuration state described by the second state data corresponds to the current configuration state of receiving facsimile machine 1420 at the time the request for the second state data is sent in step 1520.

In an embodiment, the request for second state data that is sent by security server 1430 in step 1520 is encrypted. For example, security server 1430 may encrypt the request of step 1520 using a public key associated with receiving facsimile machine 1420, and upon receiving the request of step 1520, receiving facsimile machine 1420 can decrypt the request using a private key associated with receiving facsimile machine 1420. After the request for the second state data is sent from the security server 1430 to receiving facsimile machine 1420, processing proceeds to step 1530.

In step 1530, the second state data is received from receiving facsimile machine 1420 by security server 1430. In an embodiment, the second state data may be encrypted by receiving facsimile machine 1420 using the same techniques discussed above with reference to encrypting the first state data, e.g., the second state data may be encrypted using (a) a hash function and/or a seed and/or (b) a public key associated with security server. Thereafter, processing proceeds to step 1540.

In step 1540, the first state data received in step 1510 and the second state data received in step 1530 are compared by security server 1430 to determine if the first state data and the second state data identify the same configuration state. If the first state data and the second state data identify the same configuration state, then the configuration state of receiving facsimile machine 1420 has not changed since receiving facsimile machine 1420 was registered. However, if the first state data and the second state data do not identify the same configuration state, then the configuration state of receiving facsimile machine 1420 has changed since receiving facsimile machine 1420 was registered. If the configuration of receiving facsimile machine 1420 has changed since it was registered with security server 1430, then the possibility exits that the change in configuration may result in receiving facsimile machine 1420 being less secure.

If the configuration of receiving facsimile machine 1420 has not changed since it was registered with security server 1430, the first state data and the second state data are identical. For example, if the first state data and the second state data were created using a hash function and/or a seed, then the hash value for each of the first state data and the second state data should be the same, since the configuration information used to create the hash value in each case is the same. However, if the configuration information changed since receiving facsimile machine 1420 was registered with security server 1430, then the hash value of the second state data should be different than the hash value of the first state data, since the input to the hash function used to create the hash value in each case is different. After the first state data and the second state data are compared, processing proceeds to step 1550.

In step 1550, a message, indicating whether the configuration state of receiving facsimile machine 1420 has changed, is transmitted by security server 1430 to sending facsimile machine 1410. In an embodiment, upon sending facsimile machine 1410 receiving the message, sending facsimile machine 1410 may present the message to the user of sending facsimile machine 1410 to allow the user of sending facsimile machine 1410 to take some action, e.g., the user may subsequently instruct sending facsimile machine 1410 to send a facsimile request to receiving facsimile machine 1420 anyway or may instruct sending facsimile machine 1410 to send a facsimile request to a different facsimile machine other than receiving facsimile machine 1420.

In another embodiment, sending facsimile machine 1410 may be configured to interpret the message of step 1550 to perform an action without presenting the message to the user. For example, in an embodiment, if sending facsimile machine 1410 reads the message of step 1550, and the message indicates that the configuration state of the receiving facsimile machine 1420 has changed, then sending facsimile machine 1410 may not allow the user of sending facsimile machine 1410 to send a facsimile request to receiving facsimile machine 1420 and/or present a recommendation to the user of sending facsimile machine 1410 that the user of sending facsimile machine 1410 should send a facsimile request to another facsimile machine besides receiving facsimile machine 1420.

Advantageously, a first facsimile machine may verify whether the configuration state of a second facsimile machine has been changed since the second facsimile machine has been registered with a security server. In this way, the first facsimile machine can determine whether a potential security risk exists due to a change in the configuration state of the second facsimile machine. Thus, if a facsimile machine determines that the configuration state of another facsimile machine has changed since the other facsimile machine was registered, then that facsimile machine may perform one or more actions, as described above.

Figure 16:
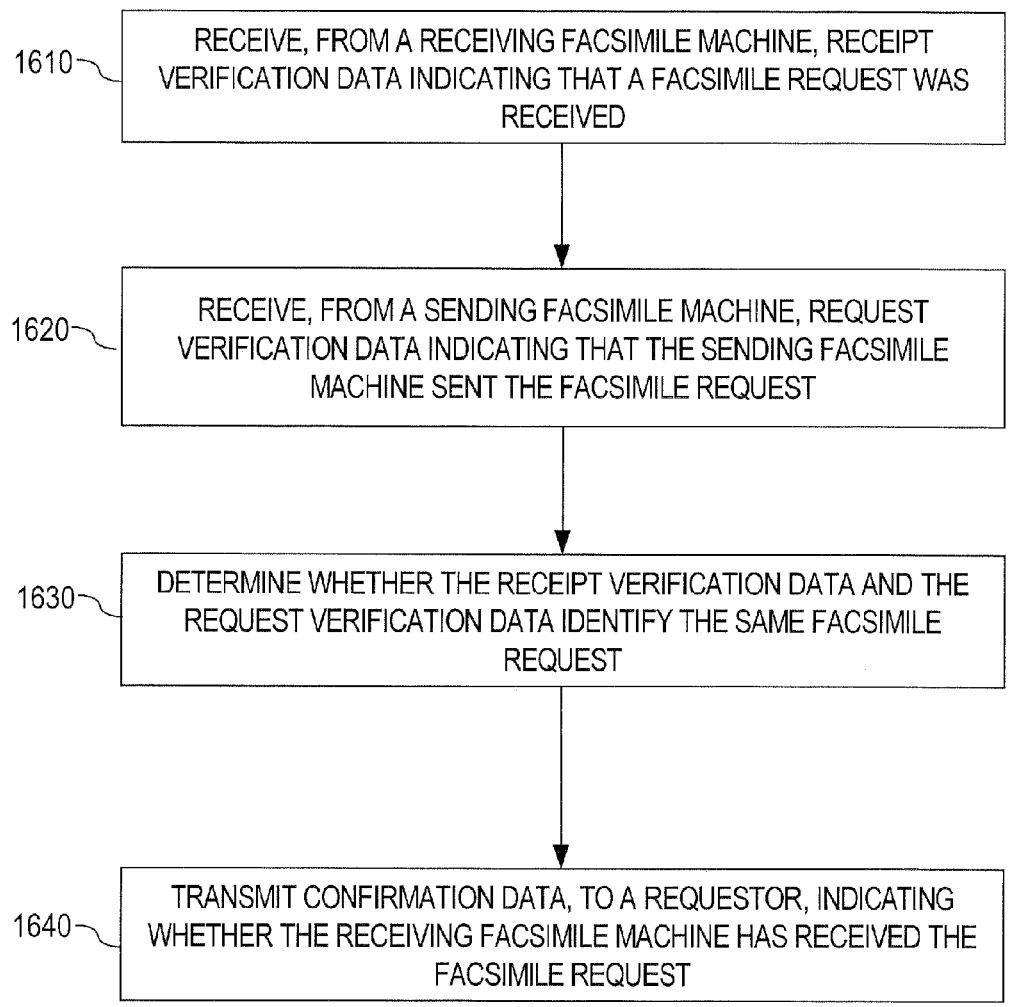
FIG. 16 is a flowchart illustrating the functional steps of verifying that a receiving facsimile machine has received a facsimile request according to an embodiment of the invention.

Verifying that a Facsimile Machine has Received a Facsimile Request in the Fax/Fax Context According to another approach for processing electronic documents in a secure manner, the receipt of a facsimile request, from a sending facsimile machine, at a receiving facsimile machine may be verified. FIG. 16 is a flowchart illustrating the functional steps of verifying that a receiving facsimile machine received a facsimile request from a sending facsimile machine according to an embodiment of the invention. For ease of explanation, the functional steps of FIG. 16 shall be explained below with reference to FIG. 14A. For purposes of providing a clear example, the steps of FIG. 16 shall be explained with reference to verifying that receiving facsimile machine 1420 received a facsimile request sent by sending facsimile machine 1410.

In step 1610, receipt verification data is received from receiving facsimile machine 1420 by security server 1430. Each time a facsimile machine receives a facsimile to process, the facsimile machine may send receipt verification data to security server 1430. The receipt verification data is data that indicates that a facsimile request has been received at a particular facsimile machine. Thus, in this example, the receipt verification data received in step 1610 indicates that a facsimile request, sent from sending facsimile machine 1410 was received by receiving facsimile machine 1420. In some embodiments, receipt verification data may also contain other information about the facsimile, e.g., the receipt verification data may also include a timestamp of when the facsimile request was received.

In an embodiment, receiving facsimile machine 1420 may generate the receipt verification data to include information that identifies (a) receiving facsimile machine 1420, (b) sending facsimile machine 1410, and (c) the facsimile request itself. For example, if document ABC was sent by facsimile from sending facsimile machine 1410 to receiving facsimile machine 1420, the receipt verification data may identify or describe document ABC transmitted by the facsimile request. Information contained in the receipt verification data that identifies document ABC may be generated by receiving facsimile machine 1420 by applying a hash function to document ABC to generate a hash value.

In an embodiment, receiving facsimile machine 1420 may encrypt the receipt verification data using any mechanism for encrypting data that security server 1430 can decrypt. For example, receiving facsimile machine 1420 may encrypt receipt verification data using a pubic key associated with security server 1430, and security server 1430 may decrypt receipt verification data using a private key associated with security server 1430.

In an embodiment, the receipt verification data may include an encrypted copy of document ABC. As explained in further detail below, the encrypted copy of document ABC may be subsequently used by security server 1430 in verifying that receiving facsimile machine 1420 received the facsimile request from sending facsimile machine 1410 and in verifying the contents of the facsimile request (which in this example is document ABC).

In an embodiment, receiving facsimile machine 1420 may send the receipt verification data to security server 1430 in response to receiving the facsimile of document ABC from sending facsimile machine 1410. In another embodiment, receiving facsimile machine 1420 may delay sending the receipt verification data to security server 1430 for a configurable period of time or until a configurable number of facsimile requests have been received by receiving facsimile machine 1420 so that receipt verification data for multiple facsimile requests may be sent from receiving facsimile machine 1420 to security server 1430 in a batch process or in single communication. After the receipt verification data is received by security server 1430 from receiving facsimile machine 1420, processing proceeds to step 1620.

In step 1620, request verification data is received from sending facsimile machine 1410 by security server 1430. Request verification data is data that indicates that a particular facsimile machine has sent a facsimile to a particular facsimile machine. Thus, in this example, the request verification data received in step 1620 indicates that sending facsimile machine 1410 has sent a facsimile request (namely document ABC in this example) to receiving facsimile machine 1420. Sending facsimile machine 1410 may transmit the request verification data to security server 1430 in response to sending the facsimile request identified by the request verification data. In other words, each time a facsimile machine sends a facsimile request, the facsimile machine may also send request verification data to security server 1430. In some embodiments, request verification data may also contain other information about the facsimile request that was sent, e.g., the request verification data may also include a timestamp of when the facsimile request was issued or information describing or identifying the content of the document sent by facsimile request.

In an embodiment, sending facsimile machine 1410 may generate the request verification data to include information that identifies (a) receiving facsimile machine 1420, (b) sending facsimile machine 1410, and (c) the document that was sent by facsimile request (document ABC in this example). Information contained in the request verification data that identifies document ABC may be generated by sending facsimile machine 1410 by applying a hash function to document ABC to generate a hash value. In such an approach, the hash function used by sending facsimile machine 1410 is the same hash function used by receiving facsimile machine 1420. As a result, the hash value computed by sending facsimile machine 1410 to identify document ABC should be the same as the hash value computed by receiving facsimile machine 1420 to identify document ABC.

Sending facsimile machine 1410 may encrypt request verification data using any mechanism for encrypting data that security server 1430 can decrypt. For example, sending facsimile machine 1410 may encrypt request verification data using a public key associated with security server 1430, and security server 1430 may decrypt request verification data using a private key associated with security server 1430. After security server 1430 receives the request verification data, processing proceeds to step 1630.

In step 1630, security server 1430 determines whether the receipt verification data and the request verification data identify the same facsimile. Security server 1430 may make this determination by inspecting the receipt verification data and the request verification data, although it may be necessary to decrypt the receipt verification data and the request verification data prior to inspection.

Embodiments may perform the comparison of step 1630 in a variety of different approaches. According to one approach, all sets of receipt verification data and all sets of request verification data received by security server 1430 are stored for a configurable amount of time by security server 1430. Security server 1430 may, upon receiving receipt verification data, determine if a set of request verification data that identifies the same request as the receipt verification data has been received. Similarly, security server 1430 may, upon receiving request verification data, determine if a set of receipt verification data that identifies the same request as the request verification data has been received. In another approach, upon receiving either the receipt verification data or the request verification data, security server 1430 may wait a configurable period of time before determining if a corresponding set of receipt verification data or request verification data has been received to allow enough time for the corresponding set of receipt verification data or request verification data to be received by security server 1430.

In an embodiment wherein receipt verification data and request verification data is stored by security server 1430 for a configurable period of time, a client or facsimile machine may issue, to security server 1430, a request to verify that a facsimile machine received a facsimile request some time after the facsimile request was sent to the facsimile machine. A client or facsimile machine may issue, to security server 1430, a request ("a verification request") to verify whether the facsimile machine received the facsimile request. The verification request includes information to identify the particular facsimile request being verified, e.g., the request may include the request verification data. Security server 1430 may then determine if any stored receipt verification data identifies the same facsimile request as the verification request.

In an embodiment, if receiving facsimile machine sent an encrypted copy of document ABC to security server 1430 as part of the receipt verification data, then security server 1430 may perform a three-way comparison between the receipt verification data, the request verification data, and server verification data. Server verification data is data that is generated by security server 1430 from the copy of the document received from receiving facsimile machine 1420. For example, if the receipt verification data and the request verification data each contain a hash value identifying document ABC, then security server 1430 may apply the hash function to document ABC to generate its own hash value. Security server 1430 may then compare the hash value contained in the receipt verification data, the hash value contained in the request verification data, and the hash value generated by security server 1430 to ensure that each identifies the same document. After the comparison of step 1630 is performed, processing proceeds to step 1640.

In step 1640, confirmation data, which indicates whether receiving facsimile machine 1420 received a facsimile request from sending facsimile machine 1410. Advantageously, security server 1430 may verify, either upon request or automatically after security server 1430 receives either request verification data or receipt verification data, to sending facsimile machine 1410 or a client that receiving facsimile machine 1420 received the facsimile request from sending facsimile machine 1410.

Additionally, if receiving facsimile machine 1420 sent an encrypted copy of document ABC to security server 1430 as part of the receipt verification data, security server 1430 may store the electronic document for a configurable period of time. In this way, security server 1430 may provide a copy of the electronic document to a requestor in response to receiving a request for the electronic document and/or in response to a verification request.

In an embodiment, in addition to verifying that a particular facsimile machine received a particular facsimile request, information stored at security server 1430 may be used in servicing requests from clients or facsimile machines to obtain other information about sent facsimiles requests, such as when a particular facsimile machine received a particular facsimile request. Having described an approach for verifying whether a facsimile machine received a facsimile request, techniques will now be discussed for verifying whether a facsimile machine sent a particular facsimile request.

Figure 17:
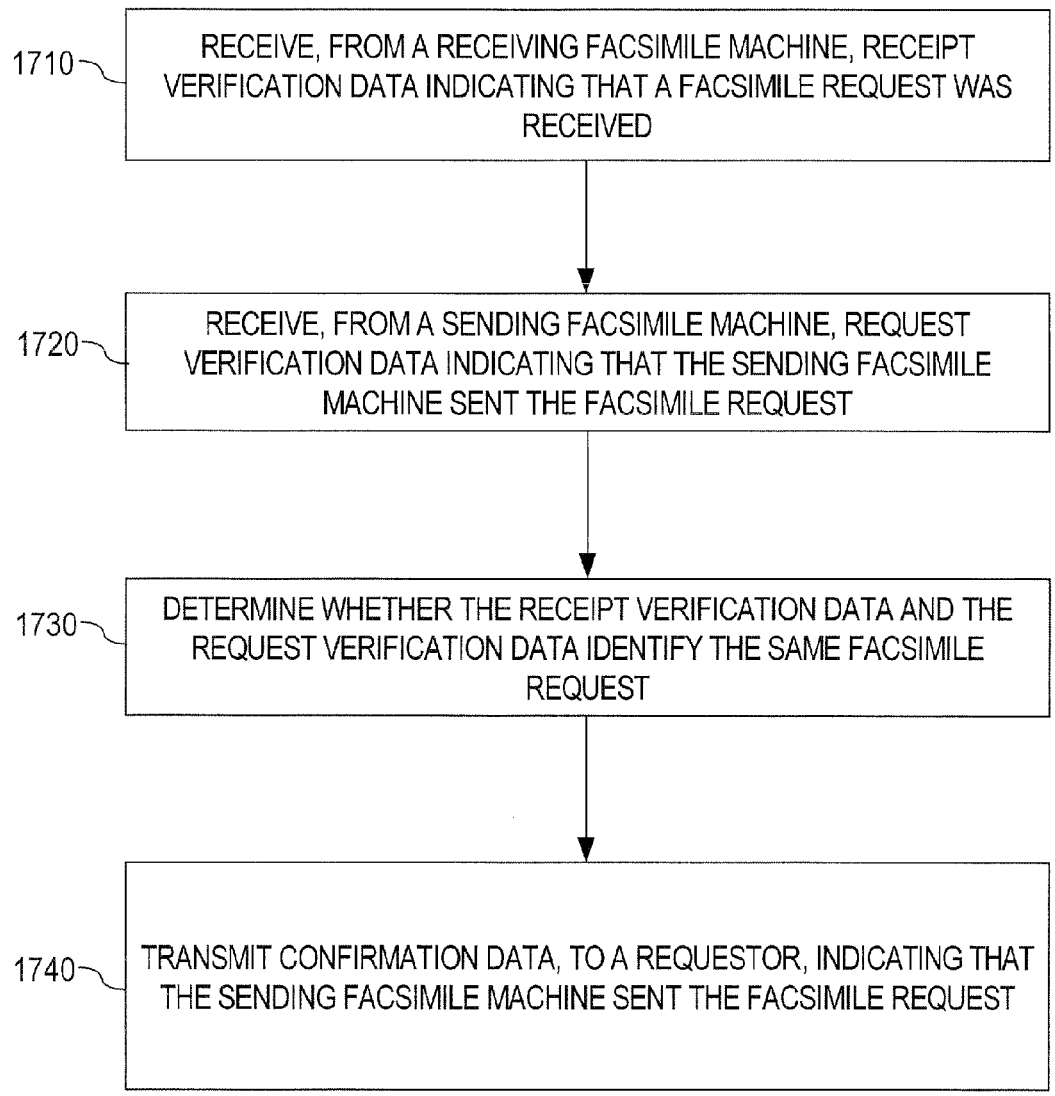
FIG. 17 is a flowchart illustrating the functional steps of verifying that a sending facsimile machine sent a facsimile request according to an embodiment of the invention.

Verifying that a Particular Facsimile Machine Issued a Facsimile Request to Another Facsimile Machine in the Fax/Fax Context According to another approach for processing electronic documents in a secure manner, the issuance of a facsimile request by a particular facsimile machine may be verified. FIG. 17 is a flowchart illustrating the functional steps of verifying that a sending facsimile machine sent a particular facsimile request according to an embodiment of the invention. For ease of explanation, the functional steps of FIG. 17 shall be explained below with reference to FIG. 4A. For purposes of providing a clear example, the steps of FIG. 17 shall be explained with reference to verifying that sending facsimile machine 1410 issued a particular facsimile request.

Steps 1710, 1720, and 1730 of FIG. 17 are similar to those discussed above with respect to steps 1610, 1620, and 1630 of FIG. 16 respectively. After the performance of step 1730, processing proceeds to step 1740.

In step 1740, confirmation data, that verifies sending facsimile machine 1410 sent a facsimile request to receiving facsimile machine 1420, is sent from security server 1430 to another entity, such as a client or another facsimile machine. In this way, the other entity, such as client associated with an administrator, may verify that sending facsimile machine 1410 sent the facsimile request (such as the facsimile request for document ABC in this example) that was received by receiving facsimile machine 1420. Receiving facsimile machine 1420 may store received confirmation data for a configurable period of time. In this way, receiving facsimile machine 1420 may prove the identity of the facsimile machine that sent facsimile requests to receiving facsimile machine 1420. For example, receiving facsimile machine 1420 may provide a mechanism to a user, such as an administrator, to enable the user to access information about which facsimile machines issued facsimile requests to receiving facsimile machine 1420 and information about those facsimile requests.

Additionally, sending facsimile machine 1410 may issue a facsimile request to security server 1430 to verify that another facsimile machine issued a particular facsimile request to receiving facsimile machine 1420. In this way, sending facsimile machine 1410 may issue requests to security server 1430 to verify that other facsimile machines issued a particular facsimile to receiving facsimile machine 1420. Such requests may need to be authenticated or be associated with a certain level of permission before the request is processed by security server 1430.

In an embodiment, in addition to verifying that a particular sending facsimile machine 1410 issued a particular facsimile request to a particular facsimile machine, information stored at security server 1430 may be used to service a request, from a requestor, to determine additional information, such as when a particular facsimile machine issued a particular facsimile request.

In an embodiment, when a user send a facsimile request using sending facsimile machine 1410, the user may also submit information that uniquely identifies the user ("user identification information") that submitted the facsimile request. Non-limiting, illustrative examples of user identification information include a username, a password, and an employee number.

In an embodiment, sending facsimile machine 1410 may include the user identification information within the request verification data sent to security server 1430 in step 1720. Additionally, the facsimile request, sent to receiving facsimile machine 1420, may also identify the user identification information, and receiving facsimile machine 1420 may include the user identification information within the receipt verification data sent to security server 1430 in step 1710. As a result, in embodiments of the invention, security server 1430 may also determine whether the receipt verification data and the request verification data identify the same user. Further, security server 1430 may also be able to verify that a particular user sent a particular facsimile request from a particular facsimile machine or to a particular facsimile machine.

Having described an approach for verifying whether a sending facsimile machine sent a particular facsimile request, techniques will now be discussed for protecting a storage device of a facsimile machine.

Protecting a Storage Device of a Facsimile Machine in the Fax/Fax Context

Figure 18:
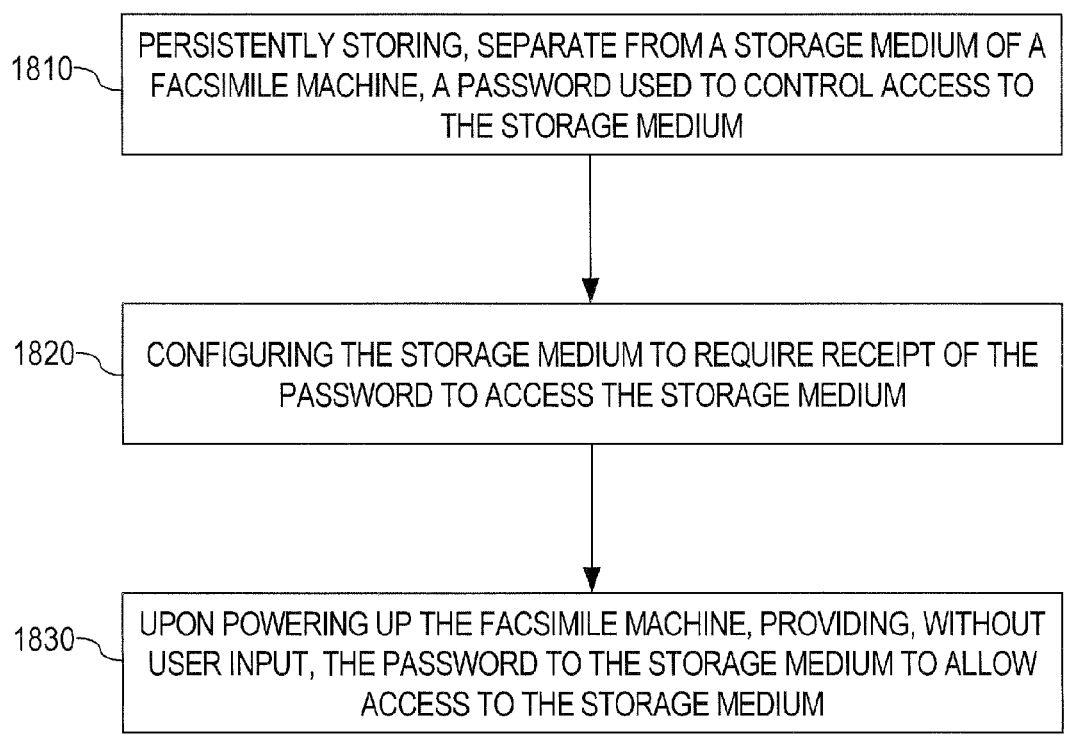
FIG. 18 is a flowchart illustrating the functional steps of protecting a storage medium of a facsimile machine according to an embodiment of the invention.
Figure 19:
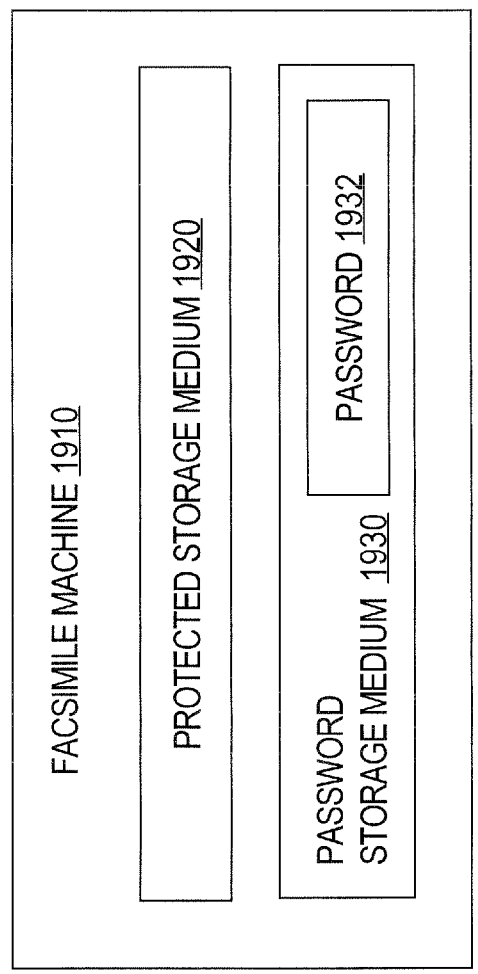
FIG. 19, which is a block diagram of an illustrative facsimile machine according to an embodiment of the invention.

According to another approach for processing electronic documents in a secure manner, a storage medium of a facsimile machine may be protected against unauthorized access. FIG. 18 is a flowchart illustrating the functional steps of protecting a storage medium of a facsimile machine according to an embodiment of the invention. For ease of explanation, the steps of FIG. 18 shall be explained below with reference to FIG. 19, which is a block diagram of an illustrative facsimile machine 1910 according to an embodiment of the invention.

Facsimile machine 1910 comprises protected storage medium 1920 and password storage medium 1930. Protected storage medium 1920 represents a persistent storage of facsimile machine 1910 that may be used to store sensitive information, such as information about the facsimile requests that have been processed by facsimile machine 1910. A non-limiting, illustrative example of protected storage medium 1920 includes a hard drive.

Password storage medium 1930 represents a persistent storage of document-processing device 1910 that may be used to store password 1932. Although any mechanism for persistently storing data may be used to implement password storage medium 1930, the capacity of password storage medium 1930 need only be a large as to accommodate the persistent storage of password 1932. A non-limiting, illustrative example of password storage medium 1930 is flash memory. Password storage medium 1930 may also be embodied as the storage medium storing the BIOS of document-processing device 1910, as password 1932 may also be stored by the BIOS of document-processing device 1910.

Password 1932 may be implemented using any data that may be used to control access to protected storage medium 1920.

In step 1810 of FIG. 18, password 1932 is persistently stored separate from the storage medium. For example, password 1932 may be stored in password storage medium 1930.

In step 1820, protected storage medium 1920 is configured to require receipt of password 1932 to access protected storage medium 1920. As a result of configuring protected storage medium 1920 to require receipt of password 1932 to access protected storage medium 1920, an entity cannot access protected storage medium 1920 without providing password 1932 to protected storage medium.

In an embodiment, protected storage medium 1920 may be embodied using an Advanced Technology Attachment (ATA) hard drive. An ATA hard drive has a hard drive controller that is located on the ATA hard drive. The drive controller of an ATA hard drive may be configured to require receipt of a password in order to access the ATA hard drive. Thus, an ATA hard drive controller may be instructed in step 1820 to require receipt of password 1932 to allow access to protected storage medium 1920.

In an embodiment, facsimile machine 1910 may automatically configure protected storage medium 1920 to require receipt of password 1932 to access protected storage medium 1920 in response to facsimile machine 1910 receiving a request to power down. In this way, protected storage medium 1920 is "locked," in that if protected storage medium 1920 is removed from facsimile machine 1910 prior to facsimile machine 1910 powering on, password 1932 must be provided to protected storage medium 1920 to access protected storage medium 1920.

In step 1830, upon powering up facsimile machine 1910, facsimile machine 1910 provides password 1932 to protected storage medium 1920 without user input, thereby "unlocking" protected storage medium 1920. As facsimile machine 1910 provides password 1932 to protected storage medium 1920 upon powering up, facsimile machine 1910 may access protected storage medium 1920.

Embodiments of the invention may advantageously be used to "lock" protected storage medium 620 when facsimile machine 1910 is powered down, thereby preventing unauthorized access to protected storage medium 1920. As protected storage medium 1920 is locked and unlocked without requiring any input or intervention from a user, the protection of protected storage medium 1920 is transparent to a user of facsimile machine 1910. If sensitive information is stored on protected storage medium 1920, and if protected storage medium 1920 is removed when facsimile machine 1910 is powered down, then protected storage medium 1920 cannot be accessed unless password 1932 is provided, thereby providing security that the sensitive information stored on protected storage medium 1920 cannot be access by unauthorized personnel.

In an embodiment, the password used to control access to protected storage medium 1920 may be changed each time facsimile machine 1910 is powered on. In such an embodiment, upon powering up facsimile machine 1910, a new password used to control access to protected storage medium 1920 is generated. Thereafter, protected storage medium 1920 is configured to (a) require receipt of the new password to allow access the protected storage medium 1920, and (b) no longer require receipt of the previous password to allow access the protected storage medium 1920.

In an embodiment, a master password may be used. A master password is a password which protected storage medium 1920 will accept to provide access to protected storage medium 1920. The drive controller of protected storage medium 1920 may be configured to allow access to protected storage medium 1920 if the master password is provided. In this way, if an administrator of facsimile machine 1910 needs to access protected storage medium 1920, the administrator may access protected storage medium 1920 with the master password. Such an embodiment is advantageous, as password 1932 may be changed each time facsimile machine 1910 is powered on as explained above. In this way, if facsimile machine 1910 fails or a problem occurs in which facsimile machine 1910 is unable to retrieve password 1932 from password storage medium 1930, the administrator may use the master password to access protected storage medium 1920. Thus, even though password 1932 may not be retrievable from protected storage medium 1920, the administrator may still gain access to protected storage medium 1920 using the master password.

In an embodiment, an administrator may configure the operation of protected storage medium 1920 by supplying the master password to the drive controller of protected storage medium 1920. One manner in which the administrator may configure protected storage medium 1920 is to (a) not permit data from being read from protected storage medium 1920 by any entity other than facsimile machine 1910, but (b) allow data stored on protected storage medium 1920 to be deleted. Such a configuration may be used when there is no need to recover the data stored on protected storage medium 1920. For example, many facsimile machines only store certain types of data for purposes of processing facsimile requests for a limited time, and do not allow subsequent retrieval of the data by other devices.

Inquiring about a User's Job Status in the Fax/Fax Context

In an embodiment, a user may send a message to a facsimile machine to obtain information about a job status. A user's job status, as used herein, generally refers to information about a facsimile request that the user submitted to a facsimile machine. A user's job status may include information about facsimile requests that are currently being processed by a facsimile machine and may include information about facsimile requests that have already been processed by a facsimile machine. In this way, a user may retrieve information about facsimile requests that the user previously sent to a facsimile machine. In an embodiment, a user who is not an administrator may only inquiry about his own job status.

To illustrate the operation an embodiment of the invention, initially a user may user a client or sending facsimile machine 1410 to send a status inquiry message to receiving facsimile machine 1420. The status inquiry message contains identification information for the user that uniquely identifies the user, e.g., the identification information may include the user's username or other unique identifier. Additionally, the status inquiry message may identify those facsimile requests that the user is interested in receiving status information. For example, the status inquiry message may identify that the user wishes to receive status information only for pending (or very recently processed) facsimile requests or for facsimile requests that the user sent within a specified bounded period of time.

Upon receiving the status inquiry message, receiving facsimile machine 1420 retrieves status information for the user in accordance with the status inquiry message. In an embodiment, receiving facsimile machine 1420 uses the identification information contained in the status inquiry message to retrieve records containing the requested status information, which may be stored at receiving facsimile machine 1420 or at security server 1430. After retrieving the records containing the requested status information, receiving facsimile machine 1420 sends the records containing the requested status information to the entity that sent the status inquiry message, such as a client or sending facsimile machine 1410 which may then display the records containing the requested status information to the user.

In an embodiment, the records containing the status information may be stored (either at receiving facsimile machine 1420 or at security server 1430) in an encrypted manner, e.g., the records may be encrypted using the user's public key, and the user may decrypt the records using their private key. In an alternate embodiment, prior to returning the records to the user, receiving facsimile machine 1420 may encrypt the records containing the requested status information. Other mechanisms for encrypting the records may be employed by other embodiments of the invention.

In an embodiment, an administrator may inquiry about the job status of any user. For example, an administrator may send a status inquiry message to receiving facsimile machine 1420 that requests the status of any number of users, including two or more users. Thus, an administrator may inquiry about the job status of another user besides the administrator. In such an embodiment, the status inquiry message sent by the administrator would contain identification information that uniquely identifies one or more users. In response to receiving the status inquiry message from an administrator, receiving facsimile machine 1420 retrieves status information for each user identified in the status inquiry message, and thereafter sends the status information to the administrator sent the status inquiry message.

In an embodiment, prior to an administrator sending a status inquiry message that inquires about the status or another user, an administrator may need to be authenticated at receiving facsimile machine 1420. Alternately, prior to receiving facsimile machine 1420 processing a status inquiry message, from an administrator, which inquires about the status or another user, the administrator may need to be authenticated at receiving facsimile machine 1420.

Verifying the Capabilities of a Receiving Facsimile Machine in the Fax/Fax Context In an embodiment, a sending facsimile machine 1410 may verify that receiving facsimile machine 1420 supports a particular feature. For example, a user may only wish to issue to a facsimile request to a facsimile machine that supports a desired security feature. Thus, an embodiment of the invention may be employed to confirm that receiving facsimile machine supports the desired security feature prior to sending facsimile machine 1410 issuing a facsimile request to receiving facsimile machine 1420.

To illustrate how an embodiment of the invention works in further detail, prior to sending facsimile machine 1410 sending a facsimile request to receiving facsimile machine 1420, sending facsimile machine 1410 sends a capability request message to receiving facsimile machine 1420. Upon receiving the capability request message, receiving facsimile machine sends capability information to sending facsimile machine 1410. The capability information describes the current capabilities of receiving facsimile machine 1420 with respect to processing facsimile requests. For example, the capability information may describe the current security features of which receiving facsimile machine 1420 is configured to provide.

Upon sending facsimile machine 1410 receiving the capability information from receiving facsimile machine 1420, sending facsimile machine 1410 determines if the current capabilities of receiving facsimile machine 1420 satisfy the desired requirements for processing a facsimile request. If the current capabilities of receiving facsimile machine 1420 do satisfy the desired requirements for processing a facsimile request, then sending facsimile machine 1410 notifies the user that the desired capabilities were obtained, and sends the facsimile request to receiving facsimile machine 1420.

However, if the current capabilities of receiving facsimile machine 1420 do not satisfy the desired requirements for processing a facsimile request, then sending facsimile machine 1410 sends a change request, to receiving facsimile machine 1420, to change the current capabilities of receiving facsimile machine 1420 so that the capabilities satisfy the desired requirements for processing a facsimile request. For example, the change request may specify that the security settings of receiving facsimile machine 1420 be updated so that receiving facsimile machine 1420 is configured to support a specified security feature. In response, receiving facsimile machine 1420 will send, to sending facsimile machine 1410, a message indicating whether the current capabilities of receiving facsimile machine 1420 may be updated in the manner requested by sending facsimile machine 1410 in the change request.

If the current capabilities of receiving facsimile machine 1420 may be updated in the manner requested by sending facsimile machine 1410 in the change request, then sending facsimile machine 1410 reports to the user that the desired capabilities were obtained, and sends a message to receiving facsimile machine 1420 instructing receiving facsimile machine 1420 to update its current capabilities in the manner requested by sending facsimile machine 1410 in the change request. In addition, thereafter sending facsimile machine 1410 sends the request to process the electronic document to receiving facsimile machine 1420.

On the other hand, if the current capabilities of receiving facsimile machine 1420 may not be updated in the manner requested by sending facsimile machine 1410 in the change request, then sending facsimile machine 1410 reports to the user that the desired capability were not obtained, and sending facsimile machine 1410 may await further instruction from the user. For example, the user may specify another facsimile machine to which a facsimile request to may be sent instead of receiving facsimile machine 1420, or may update the set of desired capabilities which are needed to process the facsimile request. In this way, sending facsimile machine 1410 may be assured that the facsimile request is processed by a facsimile machine that supports the desired capability.

System Overview of the Standalone DPD Context

According to one approach for processing electronic documents in a secure manner, a user may verify that the configuration state of a standalone document-processing device has not changed since the document-processing device was registered with a security server. Embodiments of the invention may implement the functions performed by the security server differently, as explained in further detail below.

FIG. 20A is a block diagram illustrating of an illustrative system 2000 according to an embodiment of the invention. System 2000 of FIG. 20A comprises a document-processing device 2010, a security server 2030, and communications link 2050.

A standalone document-processing device, such as document-processing device 2010, as used herein, represents any device that processes either a printed copy of a document or an electronic copy of a document which a user interacts with through a physical interface provided by the document-processing device. For example, rather than issuing a request using a client, over a communications link, to document-processing device 2010, a user interacts with document-processing device 2010 via a physical interface provided thereby. Non-limiting, illustrative examples of a document-processing device include a printer, a scanner, a facsimile machine, a copier, and a multi-function peripheral (MFP). While only one standalone document-processing device is depicted in FIG. 20A for ease of explanation, system 2000 may include any number of standalone document-processing devices.

Security server 2030 represents a device that is capable of communicating with document-processing device 2010 over communications link 2050. Security server 2030 is configured to perform security functionality. For example, security server 2030 may service requests from document-processing device 2010 to determine if the configuration state of document-processing device 2010 has changed since document-processing device 2010 was registered with security server 2030. Security server 2030 may also be used in verifying that certain actions performed in system 2000 took place, such as a user issuing a request to process a document to document-processing device 2010. The actions performed by security server 2030 shall be described in further detail below.

Communications link 2050 may be implemented by any medium or mechanism that provides for the exchange of data between document-processing device 2010 and security server 2030. Non-limiting, illustrative examples of communications link 2050 include a network such as a Local Area Network (LAN), Wide Area Network (WAN), Ethernet or the Internet, or one or more terrestrial, satellite or wireless links.

In some embodiments of the invention, the functions performed by security server 2030 may be implemented on a device that is physically connected to a standalone document-processing device. FIG. 20B is a block diagram illustrating of an illustrative system 2060 according to such an embodiment of the invention. As shown in FIG. 20B, security module 2068 is implemented on a pluggable device 2066 that is physically connected (or "plugged in") to document-processing device 2064 over communications link 2070. Security module 2068 corresponds to a functional component, such as a set of executable software instructions, on pluggable device 2066 that performs the functions described herein as being performed by security server 2030. While FIG. 20B depicts pluggable device 2066 physically connected to a single standalone document-processing device, in other embodiments of the invention, pluggable device 2066 may be physically connected to two or more standalone document-processing devices.

In other embodiments of the invention, the functions performed by security server 2030 may be implemented on a client. FIG. 20C is a block diagram illustrating of an illustrative system 2080 according to such an embodiment of the invention. As shown in FIG. 20C, security module 2086 resides on document-processing device 2084. Security module 2086 corresponds to a functional component, such as a set of executable software instructions, on document-processing device 2084 that is configured to perform the functions described herein as being performed by security server 2030.

Having described several illustrative systems, the process of verifying the configuration state of a standalone document-processing device according to an embodiment shall now be described.

Figure 21:
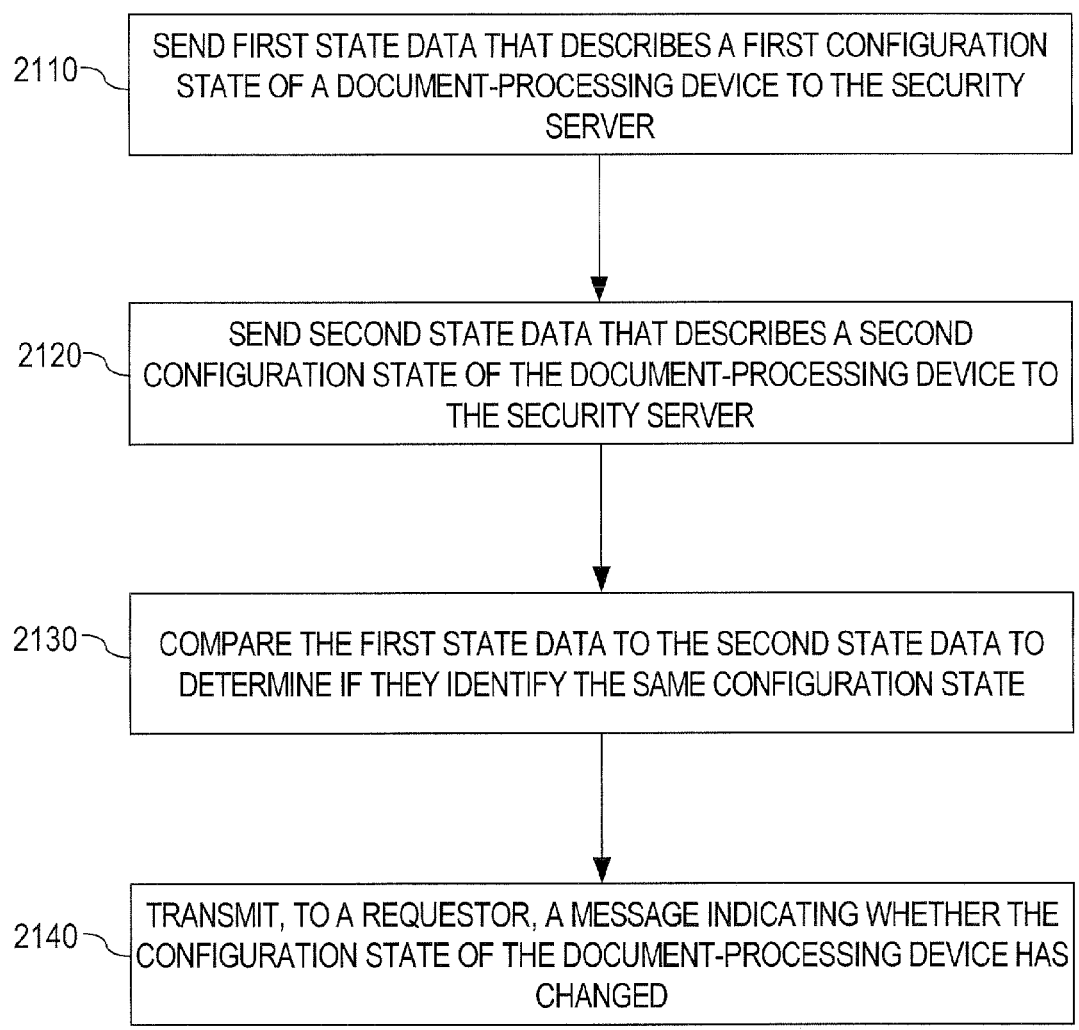
FIG. 21 is a flowchart illustrating the functional steps of determining whether a configuration state of a standalone document-processing device has changed.

Verifying the Configuration State of a Document-Processing Device in the Standalone DPD Context FIG. 21 is a flowchart illustrating the functional steps of determining whether a configuration state of a standalone document-processing device has changed. For ease of explanation, the functional steps of FIG. 21 shall be explained below with reference to FIG. 20A. However, in other embodiments of the invention, the functions performed by security server 2030 may be performed instead by a security module residing on a pluggable device or a standalone document-processing device.

In step 2110, first state data that describes a first configuration state of a standalone document-processing device is received. A user, such as an administrator, may wish to register a particular standalone document-processing device with security server 2030. The act of registering a particular standalone document-processing device with security server 2030 involves retrieving first state data from the particular standalone document-processing device, and storing the first state data with security server 2030. For purposes of providing a clear example, the steps of FIG. 21 shall be explained below with reference to receiving first state data in step 2110 that describes a first configuration state of document-processing device 2010.

An administrator may configure the physical user interface provided by document-processing device 2010 to instruct document-processing device 2010 to register with security server 2030. In response, document-processing device 2010 sends a registration request, which includes first state data, to security server 2030.

The first state data may describe any configuration state of document-processing device 2010. For example, the first state data may describe a security state of document-processing device 2010. In other words, the first state data may identify the manner in which the security settings of document-processing device 2010 are configured at the time when document-processing device 2010 is registered with security server 2030.

In an embodiment, document-processing device 2010 may create the first state data using a hash function and/or a seed to obtain a hash value to use as the first state data. Such an approach may be advantageous, as it provides a level of encryption for the first state data, since the current configuration of document-processing device 2010 cannot be inferred from inspecting the hash value. In such an embodiment, the first state data may be generated by document-processing device 2010 (a) determining a set of configuration information that describes the configuration state of document-processing device 2010, (b) hashing the configuration information using a hash function and/or a seed to obtain a hash value, and (c) using the hash value as the first state data. The hash function and/or the seed may be provided to document-processing device in the request for the first state data sent from security server 2030, in a separate message from security server 2030, or an administrator may provide the hash function and/or the seed to document-processing device 2010. If security server 2030 does not provide document-processing device 2010 with the hash function and/or seed, then the hash function and/or seed used to encrypt the first state data may also be stored at security server 2030.

Instead of or in addition to encrypting the first state data using a hash function, document-processing device 2010 may encrypt the first state data using other approaches as well. For example, the first state data may be encrypted by document-processing device 2010 using a public key associated with security server 2030, and thereafter the first state data may be decrypted by security server 2030 using a private key associated with security server 130. After security server 2030 receives the first state data, processing proceeds to step 2120.

In step 2120, document-processing device 2010 sends second state data to security server 2030. The request of step 2120 may be performed for purposes of document-processing device 2010 verifying that the configuration state of document-processing device 2010 has not changed since document-processing device 2010 was registered with security server 2030. The request to verify that the configuration state of document-processing device 2010 may be initiated automatically by document-processing device 2010 after the occurrence of an event (such as when document-processing device 2010 is powered on) or upon request of a user of document-processing device 2010. Such a request may be advantageous to ensure that document-processing device 2010 is secure. In this way, if the configuration state of document-processing device 2010 has changed since it was registered with security server 2030, then a user of document-processing device 2010, may determine that it may be too risky to issue a request to process a document since its configuration state has changed since it was registered; consequently, document-processing device 2010 may alert the user that its configuration has changed since it was registered, so the user may either knowingly accept the risk or perform another action, e.g., use another standalone document-processing device.

Second state data is data that describes a second configuration state of document-processing device 2010. The second configuration state described by the second state data corresponds to the current configuration state of document-processing device 2010. The second state data is received from document-processing device 2010 by security server 2030. In an embodiment, the second state data may be encrypted by document-processing device 2010 using the same techniques discussed above with reference to encrypting the first state data, e.g., the second state data may be encrypted using (a) a hash function and/or a seed and/or (b) a public key associated with security server. Thereafter, processing proceeds to step 2130.

In step 2130, the first state data received in step 2110 and the second state data received in step 2120 are compared by security server 2030 to determine if the first state data and the second state data identify the same configuration state. If the first state data and the second state data identify the same configuration state, then the configuration state of document-processing device 2010 has not changed since document-processing device 2010 was registered. However, if the first state data and the second state data do not identify the same configuration state, then the configuration state of document-processing device 2010 has changed since document-processing device 2010 was registered. If the configuration of document-processing device 2010 has changed since it was registered with security server 2030, then the possibility exits that the change in configuration may result in document-processing device 2010 being less secure.

If the configuration of document-processing device 2010 has not changed since it was registered with security server 2030, the first state data and the second state data are identical. For example, if the first state data and the second state data were created using a hash function and/or a seed, then the hash value for each of the first state data and the second state data should be the same, since the configuration information used to create the hash value in each case is the same. However, if the configuration information changed since document-processing device 2010 was registered with security server 2030, then the hash value of the second state data should be different than the hash value of the first state data, since the input to the hash function used to create the hash value in each case is different. After the first state data and the second state data are compared, processing proceeds to step 2140.

In step 2140, a message, indicating whether the configuration state of the document-processing device 2010 has changed, is transmitted by security server 2030 to document-processing device 2010. In an embodiment, upon document-processing device 2010 receiving the message, document-processing device 2010 may present the message to the user of document-processing device 2010 to allow the user of document-processing device 2010 to take some action, e.g., the user may subsequently instruct document-processing device 2010 to process an electronic document or a physical document anyway or the user may choose to not use document-processing device 2010 in favor of another document-processing device.

In another embodiment, document-processing device 2010 may be configured to interpret the message of step 2140 to perform an action without presenting the message to the user. For example, in an embodiment, if document-processing device 2010 reads the message of step 2140, and the message indicates that the configuration state of the document-processing device 2010 has changed, then document-processing device 2010 may not allow the user of document-processing device 2010 to issue a request to process an electronic document or a physical document and/or present a recommendation to the user of document-processing device 2010 that the user of document-processing device 2010 use another document-processing device since its configured has changed since it was last registered with security server 2030.

Advantageously, document-processing device 2010 may verify whether the configuration state of document-processing device 2010 has been changed since the document-processing device 2010 has been registered with security server 2030. In this way, document-processing device 2010 can determine whether a potential security risk exists due to a change in the configuration state of document-processing device 2010. Thus, if document-processing device 2010 determines that the configuration state of document-processing device 2010 has changed since the document-processing device was registered, then document-processing device 2010 may perform one or more actions, as described above.

Verifying Activity Occurring at a Document-Processing Device

Figure 22:
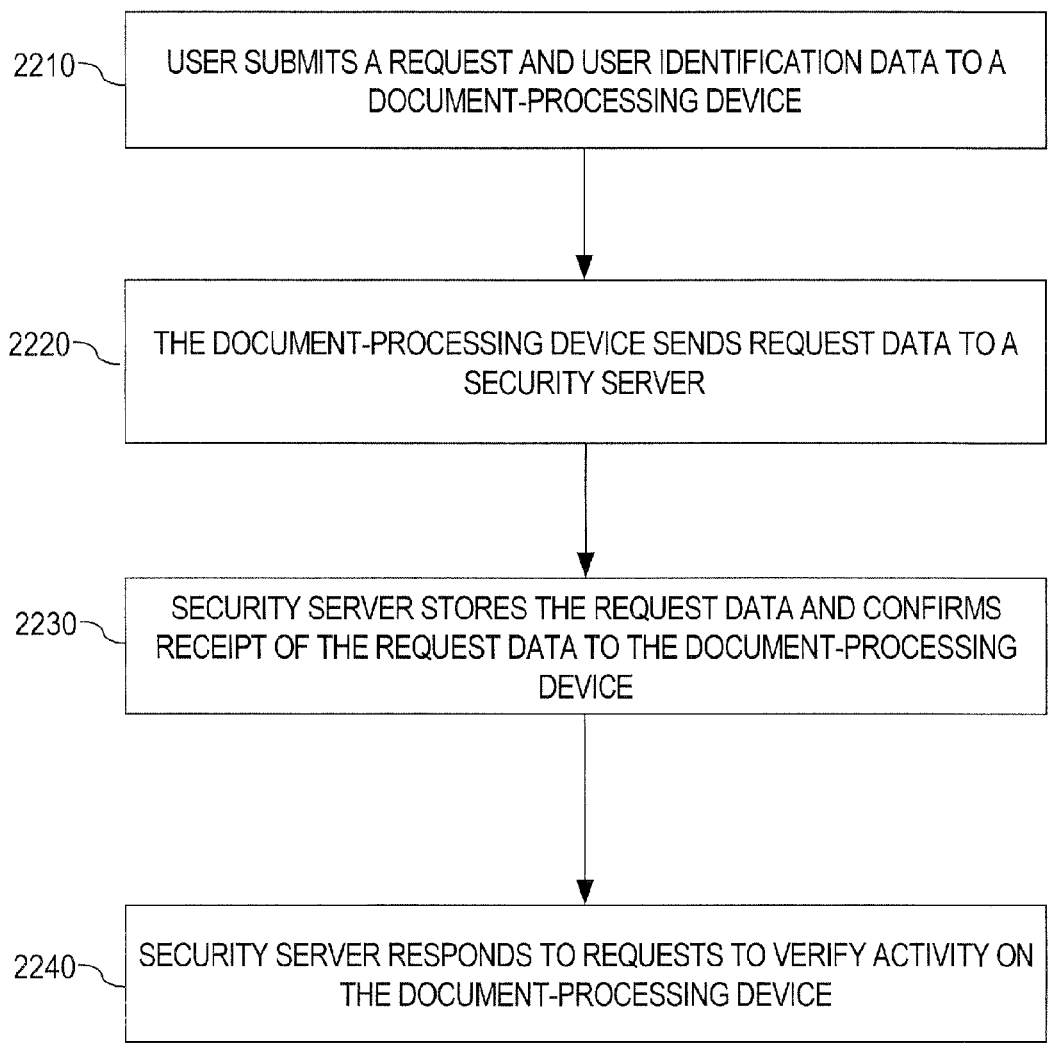
FIG. 22 is a flowchart illustrating the functional steps of verifying activity that occurred on a document-processing device according to an embodiment of the invention.

According to another approach for processing electronic documents in a secure manner, activity occurring at a document-processing device may be verified. FIG. 22 is a flowchart illustrating the functional steps of verifying activity that occurred on a document-processing device according to an embodiment of the invention. For ease of explanation, the functional steps of FIG. 22 shall be explained below with reference to FIG. 20A. For purposes of providing a clear example, the steps of FIG. 22 shall be explained with reference to verifying the identify of a user that issued a request to document-processing device 2010.

In step 2210, a user submits a request to process a document, and user identification data, to document-processing device 2010. The request to process a document may be a request to process an electronic document or a physical copy of a printed document. The user identification data is data that uniquely identifies the user. For example, the user identification data may include one or more of: a username, a password, an employee identification number, and biometric identification data. The user may submit the request and the user identification data to document-processing device 2010 in a variety of ways, e.g., through a user interface provided by document-processing device 2010 or via a communications link to document-processing device 2010. After the performance of step 2210, processing proceeds to step 2220.

In step 2220, document-processing device 2010 sends request data to security server 2030. Request data is data that describes characteristics about the request submitted by the user in step 2210. In an embodiment, the request data includes the user identification data submitted by the user in step 2210. The request data may also include an electronic copy of the document associated with the user request of step 2210, e.g., if the user submitted a request to send a facsimile copy of a physical document or a request to produce a printed copy of a physical document to document-processing device 2010 in step 2210, then document-processing device 2010 may generate an electronic copy of the document as well, and include the electronic copy of the document in the request data. In an embodiment, any electronic copy of a document included in the request data may be encrypted. The request data may also include other data, such as a job authentication code provided by document-processing device 2010 to the request of step 2210. Other examples of information included in the request data includes a timestamp as to when the request of step 2010 was received by document-processing device 2010. After document-processing device 2010 sends the request data to security server 2030, processing proceeds to step 2230.

In step 2030, security server 2030 stores the request data as activity data and confirms receipt of the request data to document-processing device 2010. The stored activity data describes the actions of users performed on document-processing device 2010. For example, the activity data may describe the actions performed by each user of document-processing device 2010, and the activity data also may describe the actions performed on a particular document by document-processing device 2010.

In an embodiment, security server 2030 may periodically purge portions of the stored activity data. For example, after a certain amount of time, an electronic copy of a document processed by document-processing device 2010 may ceased to be stored by security server 2030.

In step 2040, security server 2030 may respond to a received request to verify activity occurring on document-processing device 2010. For example, an administrator may use a client or document-processing device 2010 to issue a request to security server 2030 to verify that a user performed a certain action on document-processing device 2010 or to determine which user performed a certain action on document-processing device 2010. In response to receiving such a request, security server 2030 may consult the activity data to determine a response using the request data stored by security server 2030, and security server 2030 may subsequently transmit the response to the requestor. In an embodiment, the requestor of such a request would need to be authenticated by security server 2030 prior to security server 2030 determining a response to such a request.

As security server 2030 stores an electronic copy of a document processed by document-processing device 2010, a user may also request a copy of a document processed by document-processing device 2010 at the request of a user. For example, an administrator may be able to submit a request to security server 2030 to retrieve an electronic copy of a document that was copied by another user at some point in time using document-processing device 2010.

Inquiring about a User's Job Status in the Standalone DPD Context

In an embodiment, a user may instruct a standalone document-processing device to provide information about the user's job status. A user's job status, as used herein in this context, generally refers to information about a request to process an electronic document or a physical document that the user submitted to a standalone document-processing device. A user's job status may include information about requests that are currently being processed by the document-processing device and may include information about requests that have already been processed by the document-processing device. In this way, a user may retrieve information about all requests that the user has previously sent to a document-processing device or only those requests that satisfy certain criteria, e.g., a type of document associated with the request or those requests submitted within a specified period of time. In an embodiment, a user who is not an administrator may only inquiry about his own job status.

To illustrate the operation of an embodiment of the invention, initially a user may send a status inquiry message to document-processing device 2010. The status inquiry message contains identification information for the user that uniquely identifies the user, e.g., the identification information may include the user's username or other unique identifier. Additionally, the status inquiry message may identify those requests that the user is interested in receiving status information. For example, the status inquiry message may identify that the user wishes to receive status information only for pending requests or for requests that the user sent within a bounded period of time.

Upon receiving the status inquiry message, document-processing device 2010 retrieves status information for the user in accordance with the status inquiry message. In an embodiment, document-processing device 2010 uses the identification information contained in the status inquiry message to retrieve records containing the requested status information, which may be stored at document-processing device 2010 or at security server 2030. After retrieving the records containing the requested status information, document-processing device 2010 provides the records containing the requested status information to the user through a physical interface provided by document-processing device 2010, document-processing device 2010 may display the records containing the requested status information to the user.

In an embodiment, the records containing the status information may be stored (either at document-processing device 2010 or at security server 2030) in an encrypted manner, e.g., the records may be encrypted using the user's public key, and the user may decrypt the records using their private key. In an alternate embodiment, prior to returning the records to the user, document-processing device 2010 may encrypt the records containing the requested status information. Other mechanisms for encrypting the records may be employed by other embodiments of the invention.

In an embodiment, an administrator may inquiry about the job status of any user. For example, an administrator may send a status inquiry message to document-processing device 2010 that requests the status of any number of users, including two or more users. Thus, an administrator may inquiry about the job status of another user besides the administrator. In such an embodiment, the status inquiry message sent by the administrator would contain identification information that uniquely identifies one or more users. In response to receiving the status inquiry message from an administrator, document-processing device 2010 retrieves status information for each user identified in the status inquiry message, and thereafter provides the status information to the administrator through the user interface provided by document-processing device 2010.

In an embodiment, prior to document-processing device 2010 processing a status inquiry message, from an administrator, which inquires about the status or another user, the administrator may need to be authenticated at document-processing device 2010.

Implementing Mechanisms

Figure 6:
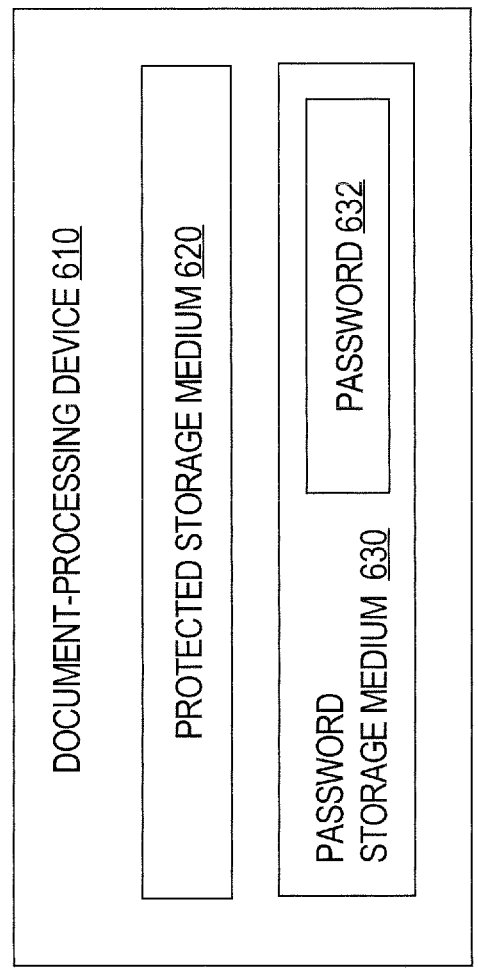
FIG. 6, which is a block diagram of an illustrative document-processing device according to an embodiment of the invention.
Figure 7:
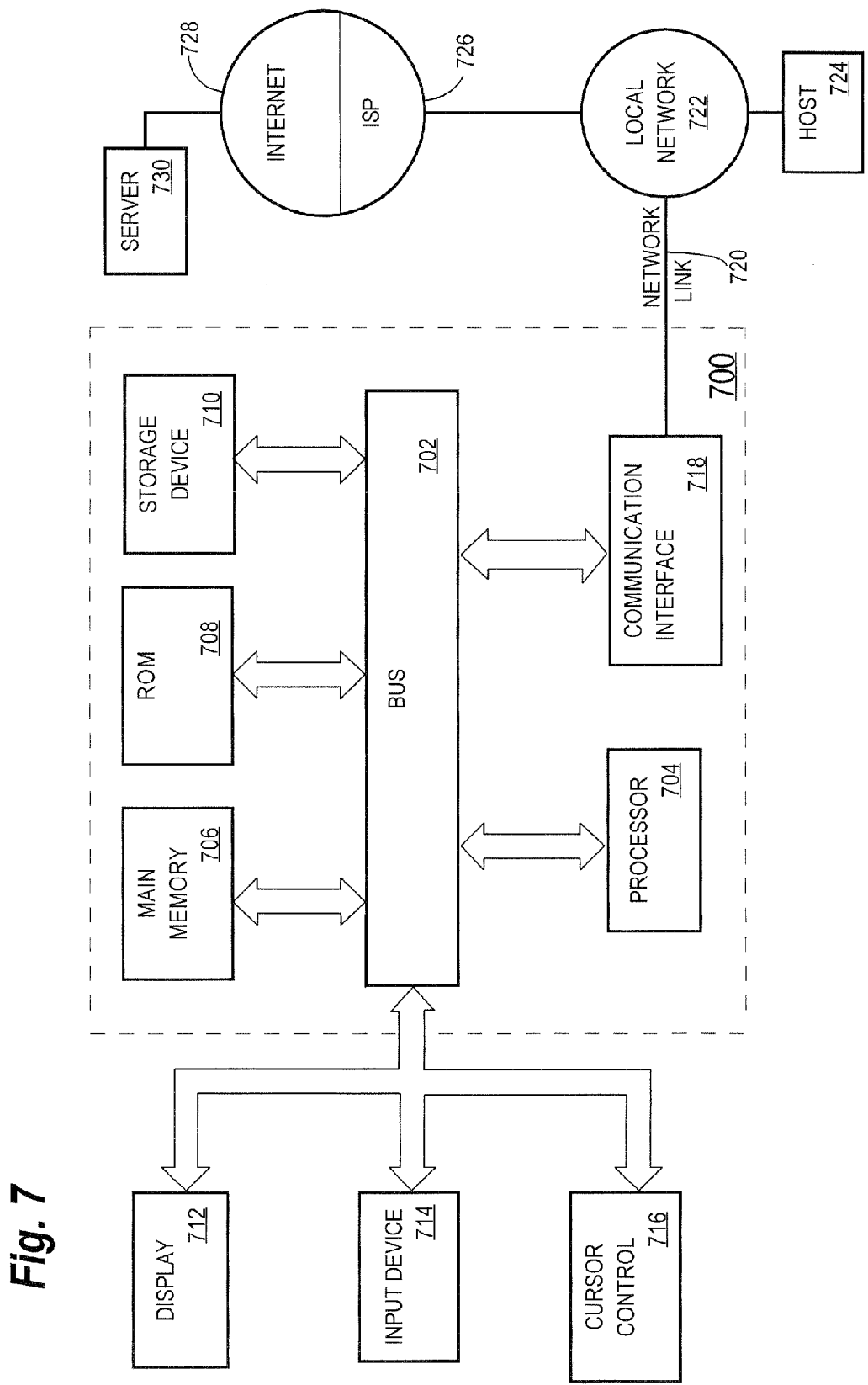
FIG. 7 is a block diagram that illustrates a computer system upon which an embodiment of the invention may be implemented.

A client, a document-processing device, a security server, a facsimile machine, a file server, and a pluggable device may each by embodied on a computer system. FIG. 6 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), a liquid crystal display (LCD), a plasma display, and a surface-conduction electron-emitter display (SED), for displaying information to a user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for protecting a file server, comprising:
  one or more processors; and
  one or more storage media storing instructions which, when processed by the one or more processors, cause:
    persistently storing, at the file server and separate from a storage medium of the file server, a password used to control access to the storage medium;
    configuring the storage medium to require receipt of the password to access the storage medium; and
    upon powering on the file server, the file server providing, without user input, the password to the storage medium to allow the file server to access to the storage medium.

2. The apparatus of claim 1, wherein the password is an existing password, and wherein processing of the instructions by the one or more processors further causes:
  upon powering up the file server, generating a new password used to control access to the storage medium; and
  upon powering up the file server, configuring the storage medium to (a) require receipt of the new password to allow access the storage medium, and (b) no longer require receipt of the existing password to allow access the storage medium.

3. The apparatus of claim 1, wherein configuring the storage medium is performed in response to receiving a request to power down the file server.

4. The apparatus of claim 1, wherein the password is persistently stored by the BIOS of the file server.

5. One or more non-transitory computer-readable media for protecting a file server, the computer-readable medium storing instructions which, when processed by one or more processors, causes:
  persistently storing, at the file server and separate from a storage medium of the file server, a password used to control access to the storage medium;
  configuring the storage medium to require receipt of the password to access the storage medium; and
  upon powering on the file server, the file server providing, without user input, the password to the storage medium to allow the file server to access to the storage medium.

6. The one or more non-transitory computer-readable media of claim 5, wherein the password is an existing password, and wherein execution of the one or more sequences of instructions by the one or more processors further causes:
  upon powering up the file server, generating a new password used to control access to the storage medium; and
  upon powering up the file server, configuring the storage medium to (a) require receipt of the new password to allow access the storage medium, and (b) no longer require receipt of the existing password to allow access the storage medium.

7. The one or more non-transitory computer-readable media of claim 5, wherein configuring the storage medium is performed in response to receiving a request to power down the file server.

8. The one or more non-transitory computer-readable media of claim 5, wherein the password is persistently stored by the BIOS of the file server.

9. A method for protecting a file server, the method comprising:
  persistently storing, at the file server and separate from a storage medium of the file server, a password used to control access to the storage medium;
  configuring the storage medium to require receipt of the password to access the storage medium; and
  upon powering on the file server, the file server providing, without user input, the password to the storage medium to allow the file server to access to the storage medium.

10. The method of claim 9, wherein the password is an existing password, and further comprising:
  upon powering up the file server, generating a new password used to control access to the storage medium; and
  upon powering up the file server, configuring the storage medium to (a) require receipt of the new password to allow access the storage medium, and (b) no longer require receipt of the existing password to allow access the storage medium.

11. The method of claim 9, wherein configuring the storage medium is performed in response to receiving a request to power down the file server.

12. The method of claim 9, wherein the password is persistently stored by the BIOS of the file server.

* * * * *